United States Patent
Calvert et al.

(10) Patent No.: US 12,211,061 B2
(45) Date of Patent: Jan. 28, 2025

(54) SYSTEMS AND METHODS FOR PROVIDING AN OFFER BASED ON CALENDAR DATA MINING

(71) Applicant: Adeia Guides Inc., San Jose, CA (US)

(72) Inventors: Peter Jason Calvert, Limerick, PA (US); Christopher Lidaka, Apex, NC (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 16/945,134

(22) Filed: Jul. 31, 2020

(65) Prior Publication Data

US 2022/0036397 A1 Feb. 3, 2022

(51) Int. Cl.
G06Q 30/0235 (2023.01)
G06Q 10/1093 (2023.01)
G06Q 20/32 (2012.01)

(52) U.S. Cl.
CPC ..... *G06Q 30/0235* (2013.01); *G06Q 10/1095* (2013.01); *G06Q 20/3224* (2013.01)

(58) Field of Classification Search
CPC .......... G06Q 30/0235; G06Q 10/1095; G06Q 20/3224; G06Q 20/4014; G06Q 20/40145
See application file for complete search history.

(56) References Cited

U.S. PATENT DOCUMENTS

| | | |
|---|---|---|
| 6,366,220 B1 | 4/2002 | Elliott |
| 8,135,624 B1 | 3/2012 | Ramalingam et al. |
| 8,745,132 B2 | 6/2014 | Obradovich |
| 8,751,293 B2 | 6/2014 | Hall et al. |
| 8,818,618 B2 | 8/2014 | Follmer et al. |
| 9,154,534 B1 | 10/2015 | Gayles et al. |
| 9,639,907 B2 | 5/2017 | Theobald |
| 9,893,825 B1 | 2/2018 | Rao et al. |
| 9,996,861 B2 | 6/2018 | Ryan et al. |
| 10,032,212 B2 | 7/2018 | Winkelman et al. |
| 10,235,675 B1 | 3/2019 | Haverlah |
| 10,248,773 B2 | 4/2019 | Wright et al. |
| 10,306,430 B1 | 5/2019 | Abari et al. |

(Continued)

FOREIGN PATENT DOCUMENTS

| | | |
|---|---|---|
| AU | 2019203222 B2 | 6/2019 |
| WO | 2007011786 A2 | 1/2007 |

(Continued)

OTHER PUBLICATIONS

U.S. Appl. No. 16/810,060, filed Mar. 5, 2020, Peter Jason Calvert.
U.S. Appl. No. 16/810,065, filed Mar. 5, 2020, Peter Jason Calvert.
U.S. Appl. No. 16/810,067, filed Mar. 5, 2020, Peter Jason Calvert.
U.S. Appl. No. 16/826,535, filed Mar. 23, 2020, Peter Jason Calvert.
U.S. Appl. No. 16/826,780, filed Mar. 23, 2020, Peter Jason Calvert.
U.S. Appl. No. 16/913,693, filed Jun. 26, 2020, Peter Jason Calvert.
U.S. Appl. No. 16/913,694, filed Jun. 26, 2020, Peter Jason Calvert.

(Continued)

*Primary Examiner* — Rutao Wu
*Assistant Examiner* — Stephen S Swartz
(74) *Attorney, Agent, or Firm* — Haley Guiliano LLP

(57) ABSTRACT

Methods and systems are employed for searching a first user's calendar schedule for a meeting with a second user, providing an offer from a merchant based on a user's calendar schedule and automatically applying the offer from the merchant based on arrival of the first user and second user at the merchant's location. The verification of the presence of the first user and the second user may be based on identifying the location of each user, and offers from merchant locations may be provided based on the respective locations of the users.

20 Claims, 9 Drawing Sheets

(56) References Cited

U.S. PATENT DOCUMENTS

| | | |
|---|---|---|
| 10,313,714 B2 | 6/2019 | Logan |
| 10,482,441 B1 | 11/2019 | Watson et al. |
| 10,504,094 B1 | 12/2019 | Gaudin et al. |
| 10,599,390 B1 | 3/2020 | Brahmbhatt et al. |
| 10,706,487 B1 | 7/2020 | Chachra et al. |
| 10,783,531 B2 | 9/2020 | Henderson et al. |
| 10,803,440 B1 | 10/2020 | Gaudin et al. |
| 10,810,572 B1 | 10/2020 | Gaudin et al. |
| 10,846,313 B2* | 11/2020 | Finnegan ............ G06F 16/9537 |
| 10,972,206 B1 | 4/2021 | Calvert et al. |
| 10,992,401 B1 | 4/2021 | Calvert et al. |
| 10,997,570 B1 | 5/2021 | Kurani et al. |
| 10,999,416 B1 | 5/2021 | Verma et al. |
| 11,023,957 B1 | 6/2021 | Montague |
| 11,074,617 B2 | 7/2021 | Patil et al. |
| 11,107,104 B1 | 8/2021 | Brannan et al. |
| 11,599,880 B2 | 3/2023 | Calvert et al. |
| 11,790,364 B2 | 10/2023 | Calvert et al. |
| 11,805,160 B2 | 10/2023 | Calvert et al. |
| 2005/0024189 A1 | 2/2005 | Weber |
| 2006/0161599 A1* | 7/2006 | Rosen ................... H04L 67/306 |
| 2006/0239501 A1 | 10/2006 | Petrovic et al. |
| 2007/0039018 A1 | 2/2007 | Saslow et al. |
| 2007/0118603 A1* | 5/2007 | Washburn ............... H04L 67/53 |
| | | 709/206 |
| 2008/0092168 A1 | 4/2008 | Logan et al. |
| 2008/0156173 A1 | 7/2008 | Bauer |
| 2009/0216433 A1 | 8/2009 | Griesmer et al. |
| 2010/0082568 A1 | 4/2010 | Lee et al. |
| 2010/0153008 A1 | 6/2010 | Schwartz et al. |
| 2010/0280956 A1 | 11/2010 | Chutorash et al. |
| 2010/0292816 A1 | 11/2010 | Anzures et al. |
| 2011/0078024 A1 | 3/2011 | Messier et al. |
| 2011/0093344 A1 | 4/2011 | Burke et al. |
| 2011/0106375 A1 | 5/2011 | Gurusamy |
| 2011/0117933 A1 | 5/2011 | Andersson |
| 2011/0209062 A1 | 8/2011 | Faenger et al. |
| 2011/0307350 A1 | 12/2011 | Kamimaeda et al. |
| 2011/0314388 A1 | 12/2011 | Wheatley |
| 2011/0320021 A1 | 12/2011 | Tahara et al. |
| 2012/0095819 A1 | 4/2012 | Li |
| 2012/0209657 A1 | 8/2012 | Connolly |
| 2012/0296716 A1 | 11/2012 | Barbeau et al. |
| 2012/0310713 A1 | 12/2012 | Mercuri et al. |
| 2013/0018792 A1 | 1/2013 | Casey et al. |
| 2013/0085928 A1 | 4/2013 | McKinney |
| 2013/0173419 A1 | 7/2013 | Farber et al. |
| 2013/0185368 A1* | 7/2013 | Nordstrom ............ H04W 4/023 |
| | | 709/206 |
| 2013/0191213 A1* | 7/2013 | Beck .................... G06Q 20/208 |
| | | 705/14.53 |
| 2013/0317944 A1* | 11/2013 | Huang ................ G01S 5/02521 |
| | | 455/457 |
| 2013/0332274 A1 | 12/2013 | Faith et al. |
| 2014/0025470 A1 | 1/2014 | Berman et al. |
| 2014/0045530 A1 | 2/2014 | Gordon et al. |
| 2014/0188920 A1 | 7/2014 | Sharma et al. |
| 2014/0240089 A1 | 8/2014 | Chang |
| 2014/0281971 A1 | 9/2014 | Isbell et al. |
| 2014/0310060 A1 | 10/2014 | Malsbenden et al. |
| 2015/0058224 A1 | 2/2015 | Gaddam et al. |
| 2015/0081157 A1 | 3/2015 | Banasky et al. |
| 2015/0088660 A1* | 3/2015 | Song .................... G06Q 20/042 |
| | | 705/14.64 |
| 2015/0120453 A1 | 4/2015 | Lee et al. |
| 2015/0120509 A1 | 4/2015 | Moring et al. |
| 2015/0127493 A1 | 5/2015 | Winkelman et al. |
| 2015/0154571 A1* | 6/2015 | Zamer ................. G06Q 20/384 |
| | | 705/5 |
| 2015/0161643 A1 | 6/2015 | Randell et al. |
| 2015/0188967 A1 | 7/2015 | Paulauskas et al. |
| 2015/0220992 A1 | 8/2015 | Brown et al. |
| 2015/0234939 A1* | 8/2015 | Aharony ............. G06F 16/9537 |
| | | 707/754 |
| 2015/0254720 A1 | 9/2015 | Newberg et al. |
| 2015/0269600 A1 | 9/2015 | Randle |
| 2015/0356665 A1 | 12/2015 | Colson et al. |
| 2015/0363986 A1 | 12/2015 | Hoyos et al. |
| 2015/0365725 A1 | 12/2015 | Belyaev et al. |
| 2016/0005003 A1* | 1/2016 | Norris ................... H04L 65/403 |
| | | 455/456.3 |
| 2016/0063511 A1 | 3/2016 | Ben-Eliezer et al. |
| 2016/0088435 A1* | 3/2016 | Weksler ................ H04W 4/021 |
| | | 455/414.2 |
| 2016/0098412 A1 | 4/2016 | Davidsson et al. |
| 2016/0119661 A1 | 4/2016 | Jonnadula et al. |
| 2016/0162936 A1 | 6/2016 | Khalil |
| 2016/0196345 A1 | 7/2016 | Kreifeldt |
| 2016/0197967 A1 | 7/2016 | Kreifeldt et al. |
| 2016/0210670 A9 | 7/2016 | Bennett |
| 2017/0001564 A1 | 1/2017 | Bollea et al. |
| 2017/0024725 A1 | 1/2017 | Fung et al. |
| 2017/0091764 A1 | 3/2017 | Lloyd et al. |
| 2017/0113683 A1 | 4/2017 | Mudalige et al. |
| 2017/0116600 A1 | 4/2017 | Sharan |
| 2017/0166221 A1 | 6/2017 | Osterman et al. |
| 2017/0195166 A1 | 7/2017 | Keerthi et al. |
| 2017/0197617 A1 | 7/2017 | Penilla et al. |
| 2017/0236097 A1* | 8/2017 | Smith ................. G06Q 10/1095 |
| | | 705/7.19 |
| 2017/0255966 A1 | 9/2017 | Khoury |
| 2017/0278179 A1 | 9/2017 | Perrier et al. |
| 2017/0289616 A1 | 10/2017 | Igarashi et al. |
| 2017/0293910 A1 | 10/2017 | Tinskey et al. |
| 2017/0300975 A1 | 10/2017 | Iannace et al. |
| 2017/0323505 A1 | 11/2017 | Gaddam et al. |
| 2017/0337546 A1 | 11/2017 | Holmes |
| 2018/0033045 A1* | 2/2018 | Flynn .................. G06Q 30/0269 |
| 2018/0033300 A1 | 2/2018 | Hansen |
| 2018/0063684 A1* | 3/2018 | Cheng ..................... H04W 4/02 |
| 2018/0122022 A1 | 5/2018 | Kelly et al. |
| 2018/0130095 A1 | 5/2018 | Khoury |
| 2018/0178737 A1 | 6/2018 | Studnicka |
| 2018/0189769 A1* | 7/2018 | Narasimhan ............ G06Q 20/20 |
| 2018/0236361 A1 | 8/2018 | Ninoles et al. |
| 2018/0240169 A1* | 8/2018 | Driscoll ............... G06Q 30/0633 |
| 2018/0253805 A1 | 9/2018 | Kelly et al. |
| 2018/0255114 A1 | 9/2018 | Dharmaji |
| 2018/0275648 A1 | 9/2018 | Ramalingam |
| 2018/0276674 A1 | 9/2018 | Ramatchandirane et al. |
| 2018/0285465 A1* | 10/2018 | Schaffernoth ............ G06F 16/29 |
| 2018/0308081 A1 | 10/2018 | Kursun et al. |
| 2018/0336515 A1 | 11/2018 | Mehring et al. |
| 2018/0350144 A1* | 12/2018 | Rathod ................. A63F 13/216 |
| 2018/0374126 A1* | 12/2018 | Patil ....................... B60W 40/08 |
| 2019/0035284 A1 | 1/2019 | Tam |
| 2019/0043370 A1* | 2/2019 | Mulhall ..................... B64F 1/32 |
| 2019/0196503 A1 | 6/2019 | Abari et al. |
| 2019/0197514 A1* | 6/2019 | Tineo ....................... H04W 4/08 |
| 2019/0205951 A1 | 7/2019 | Brock |
| 2019/0212167 A1 | 7/2019 | Yamada et al. |
| 2019/0251770 A1 | 8/2019 | Gaddam et al. |
| 2019/0306214 A1 | 10/2019 | Drapeau et al. |
| 2019/0333378 A1 | 10/2019 | Luzifovich et al. |
| 2019/0337512 A1 | 11/2019 | Tahmasbi-Sarvestani et al. |
| 2019/0347640 A1 | 11/2019 | Runyan et al. |
| 2019/0360823 A1 | 11/2019 | Nelson et al. |
| 2019/0361463 A1* | 11/2019 | Nelson ................. G06F 16/9537 |
| 2019/0367062 A1 | 12/2019 | Brooks et al. |
| 2020/0005351 A1* | 1/2020 | Gupta ................. G06Q 30/0205 |
| 2020/0020022 A1 | 1/2020 | Friedman et al. |
| 2020/0080853 A1 | 3/2020 | Tam et al. |
| 2020/0104899 A1 | 4/2020 | Banerjee et al. |
| 2020/0107064 A1 | 4/2020 | Shafai et al. |
| 2020/0137464 A1 | 4/2020 | Lewis et al. |
| 2020/0184437 A1 | 6/2020 | Kelly et al. |
| 2020/0204966 A1 | 6/2020 | Thagadur Shivappa et al. |
| 2020/0213298 A1 | 7/2020 | Ericson |
| 2020/0258306 A1 | 8/2020 | Forutanpour et al. |
| 2020/0342379 A1 | 10/2020 | Phillips et al. |
| 2020/0372488 A1 | 11/2020 | Bhasin |
| 2020/0380576 A1 | 12/2020 | Driscoll et al. |
| 2020/0393259 A1 | 12/2020 | Gantt et al. |

(56) References Cited

U.S. PATENT DOCUMENTS

| | | |
|---|---|---|
| 2021/0044845 A1 | 2/2021 | Bertolami et al. |
| 2021/0056555 A1 | 2/2021 | Kurylko et al. |
| 2021/0241628 A1 | 8/2021 | Otaka et al. |
| 2021/0281904 A1 | 9/2021 | Calvert et al. |
| 2021/0295387 A1 | 9/2021 | Calvert et al. |
| 2021/0297472 A1 | 9/2021 | Calvert et al. |
| 2021/0311982 A1 | 10/2021 | Kizelshteyn et al. |
| 2021/0312386 A1 | 10/2021 | Kumar et al. |
| 2021/0357940 A1 | 11/2021 | Benkreira et al. |
| 2021/0406893 A1 | 12/2021 | Calvert et al. |
| 2021/0406894 A1 | 12/2021 | Calvert et al. |
| 2022/0036396 A1 | 2/2022 | Calvert et al. |
| 2022/0130247 A1 | 4/2022 | Liu |
| 2022/0300921 A1 | 9/2022 | Book et al. |
| 2022/0366397 A1 | 11/2022 | Gaudin et al. |
| 2024/0078550 A1 | 3/2024 | Calvert et al. |
| 2024/0129349 A1 | 4/2024 | Calvert et al. |

FOREIGN PATENT DOCUMENTS

| | | |
|---|---|---|
| WO | 2009082748 A1 | 7/2009 |
| WO | 2011061581 A1 | 5/2011 |
| WO | WO 2013132449 | 9/2013 |

OTHER PUBLICATIONS

U.S. Appl. No. 16/945,140, filed Jul. 31, 2020, Peter Jason Calvert.

Copeland et al., "Wallet-on-Wheels—Using Vehicle's Identity for Secure Mobile Money," 2013 17th International Conference on Intelligence in Next Generation Networks (ICIN) (8 pages).

Mike Aday, "Country store ledgers provide an intimate look at lives from the past," Great Smoky Mountains Association 2018.

Rebecca Copeland, "Wallet-on-Wheels—using vehicle's identity for secure mobile money," 2013 17th Int'l Conference on Intelligence in Next Generation Networks.

* cited by examiner

SYSTEMS AND METHODS FOR PROVIDING AN OFFER BASED ON CALENDAR DATA MINING

BACKGROUND

The present disclosure relates generally to systems and methods for providing vehicle-associated offers from merchants and, more particularly, systems and methods for completing a transaction based on a scheduled meeting at the merchant's location. In another example, the present disclosure is directed to systems and methods for determining repeat transactions and ordering repeat transactions based on vehicle's path and/or location.

SUMMARY

Commonly, users schedule meetings with colleagues or friends in their calendar, while leaving the location as blank or "to be determined" or "TBD." In most cases, the location will then have to be manually decided by the users at a later point. Selecting of the location may also require additional back-and-forth communications between the users. In another scenario, the users may choose a location and, upon arriving at that location, realize that the location is closed. In yet further example, the users may be required to search through many promotions (e.g., Groupon, etc.) to find a suitable location for the meeting. Ultimately, selection of a meeting location can be a very cumbersome and time-consuming task.

Accordingly, to solve these problems, methods and systems are disclosed for searching a first user's calendar schedule for a meeting with a second user, providing an offer from a merchant based on a user's calendar schedule and automatically applying the offer from a merchant based on presence of the first user and second user at the merchant's location. This approach improves the selection of the location for the meeting by providing suggestions with an offer to hold a meeting at the merchant's location. The methods and systems identify the location of each user and provide offers from merchant locations based on the respective locations of the users. The time-consuming task of selection of a location for a meeting is reduce and simplified. For example, the system may identify offers from merchant locations that may be between the locations of the users, or from merchants with the shortest driving distance for each user to travel. Further, upon the users arriving at the merchant's location, the offer is automatically applied to their transaction.

In some embodiments, the system searches a first user's calendar schedule for meetings with no locations specified, e.g., the location as blank, to be determined, or TBD. In response to identifying a meeting with no location or one of the previous identifiers, the system transmits to the user a message to host the meeting at a merchant's location that includes an offer (e.g., discount on a purchase if the meeting is held at the merchant's location) from the merchant. Upon determining that the first user and the second user are simultaneously present at the merchant's location, the merchant system applies the offer to the first user's transaction. In some embodiments, as the first user schedules a meeting with a second user (e.g., a coworker, a friend, family member, a client, etc.), with an undetermined location, a system (e.g., merchant system, user's mobile device system, user's vehicle system, cloud-based system, etc.) may transmit an offer from a merchant (e.g., Chili's, Fridays, etc.) to host the meeting. For example, the merchant may transmit to the first user and second user an offer of "Come to Friday's for 15% off your lunch." In response to the system determining that the first user and the second user are simultaneously present at the merchant, the merchant applies the offer (e.g., discount) to the first user's transaction. Various examples of vehicle offers applied in a vehicle are described in U.S. patent application Ser. No. 16/826,535 entitled "Systems And Methods For Providing An Offer Based On Vehicle Identification" and filed on Mar. 23, 2020, which is incorporated by reference herein in its entirety.

To verify the simultaneous presence of the first user and second user at the merchant's location, a merchant system may verify the location of each user via a GPS of each vehicle associated with first user and second user, a GPS of the mobile device associated with first user and second user, or camera capture of the first user and the second user, or camera capture of the first user's vehicle and the second user's vehicle. In some embodiments, to verify that both users are present at the merchant to claim the offer, a unique code may be generated, and a request may be made for each user to enter the unique code (e.g., password, PIN, etc.). In some embodiments, as the users are traveling towards the merchant in separate vehicles, the system may provide for both to listen to, a concurrent presentation of entertainment. For example, both users are listening to the same music, or radio talk show or news, or quarterly report as they travel towards the meeting at the merchant. Various examples of concurrent presentation of the same content in each of the vehicles as they travel to the merchant are described in U.S. patent application Ser. No. 16/826,780 entitled "Systems And Methods For Concurrent Content Presentation" and filed on Mar. 23, 2020, which is hereby incorporated by reference herein in its entirety.

In some embodiments, for the offer to be applied to the user's transaction, via an internet-connected vehicle, the system may require leveraging a single-factor or multi-factor authentication to compare vehicle identification information or user identification information based on stored information. For example, when attempting to complete a transaction, the system may use multi-factor verification including vehicle identification information (e.g., VIN, type and color, license plate, etc.) for the first user and the second user. Upon receiving a request to accept an offer, in response to scheduling the meeting at the merchant, the system may capture the vehicle identification information for both, the first user and second user, and perform a multi-factor authentication by comparing the captured vehicle identification information for each user to stored authentication information. Then, the matching vehicle identification information of both users can be used jointly to authenticate a vehicle/vehicle pair (e.g., first user and second user), allowing the merchant to apply the offer to the transaction. In some embodiments, the multi-factor authentication may be completed by comparing GPS coordinates for the mobile device of the first user and of the second user. Various examples of multi-factor authentication are described in U.S. patent application Ser. Nos. 16/913,693 and 16/913,694 entitled "Systems And Methods For Providing Multi-Factor Authentication For Vehicle Transactions" and filed on Jun. 26, 2020, which are hereby incorporated by reference herein in their entirety.

In some embodiments, the system further includes determining that the first user and second user are simultaneously present at the merchant's location within a predetermined time range. For example, the offer may be valid only for a predetermined length of time. That is, the first user and second user need to be at the merchant's location during this time period to claim the offer. In some embodiments, the offer may be valid only during the time of the calendar meeting. For example, the meeting was scheduled from 12:30 to 13:30, and similarly, the offer would be valid only during this period. In another example, the offer may be valid for 24 hours after acceptance.

In some embodiments, the system further includes determining that the first user and the second user are proximate to the merchant's location. To determine that both the first user and the second user are proximate to the merchant, the system determines a geographical location for the first user and the second user, and a geographic location of the merchant's location, for example, the GPS coordinates for the merchant and the GPS coordinates for the first user and second user's mobile devices may be used to determine the user locations. In some embodiments, a camera may be used to determine that the first user and the second user are in proximity of the merchant, for example, the merchant's camera may be used to capture images of the users and use facial recognition techniques to confirm that the first user and second user are present at the merchant's location. Upon determining the location for each of the users and merchant, the system determines that the locations of the users (first and second user) are within a threshold distance (e.g., 20 feet, 30 feet, 40 feet, 50 feet, etc.) of the location of the merchant, and it proceeds to apply the offer to the first user's transaction.

Another problem is commonly faced by users who routinely make the same or similar purchases at the same merchant. In one approach, the user still needs to enter a merchant's location and manually place an order for the same product for the merchant to provide. For example, a user may routinely order a type of coffee every day on the way to work (e.g., large dark roast with splash of milk), or a similar lunch every Wednesday or a type of coffee on the way home from work. Upon placing the order with the merchant, the user waits for the order to be prepared. The line to make the order may be long, and the time to make the order may also be long and potentially may expose the user to contact with many individuals including persons with Covid-19, within the premises of the merchant e.g., employees, other customers. Many merchants have developed kiosks to speed up the ordering process, while other merchants have developed mobile phone applications that require the user to enter and place an order. Merchants to do not have an ability to place a repeat order automatically. Further, conventional vehicles do not possess an ability to automatically place a repeat order without the user having to manually place the order.

Additional advantages, methods and systems are provided for ordering a repeat order from a merchant via an internet-connected vehicle by identifying a pattern by a user at a merchant, and based on the user's location automatically placing a repeat order and without the user having to manually place the order. In some embodiments, the system accesses metadata associated with the user's historical transactions at a merchant, and identifies a repeat transaction, e.g., a transaction that the user repeats based on an identifiable pattern, for example, a transaction at the same time every day, or a transaction every Monday, at a specific time. Further, the system determines that a vehicle is within a first threshold distance of the merchant and, in response, transmits to the merchant instructions to prepare an order matching the repeat transaction. For example, upon the user driving within a threshold range of a merchant, the vehicle automatically transmits instructions to the merchant to prepare the repeat order.

In some embodiments, the system determines that the vehicle is traveling towards a location of the merchant and, in response, transmits to the merchant instructions to prepare an order matching the repeat transaction. For example, upon detecting that the user is traveling towards the merchant (e.g., by mapping a trajectory of the user using GPS data or by determining that the user has entered the merchant's address into the navigation application as a destination), the vehicle automatically transmits instructions to the merchant to prepare the repeat order, e.g., large mocha latte, or large dark roast coffee with a splash of milk. In some embodiments, the system may further transmit, via a vehicle user interface, a prompt to accept the repeat order. In response to receiving acceptance, the merchant may proceed to prepare the order.

In some embodiments, the system applies a time required to complete the transaction. For example, the repeat transaction occurs at a specific time during every occurrence, therefore the prompt for the repeat transaction may occur at the same time. That is, if the order is placed on Monday at 8:30 every time, then when the user is traveling towards the merchant at 8 am on a Monday, the system may transmit instructions for the order to the merchant.

In some embodiments, the system identifies a repeat transaction based on a number of repeat purchases, time of day, or day of the week. In some embodiments, the system may identify the same transaction that occurred twice on two Mondays at 8:30 am and flag it as a repeat transaction. Further, the user may have a plurality of repeat transactions, for example, coffee at 8:30 am at Dunkin, salad at McDonald's at 12:15 pm, tea at 5:15 pm at Starbucks.

In some embodiments, the system may present via a speaker in the vehicle an offer for repeat order from the merchant. For example, as the user is driving towards the merchant, the merchant may transmit to the vehicle an offer for the repeat orders over the vehicle's speaker and microphone system. The user may transmit acceptance via the vehicle's microphone, or the vehicle's user interface. In some embodiments, the repeat order is placed automatically. Further, in response to receiving acceptance of the repeat orders via the vehicle's user interface, the merchant may proceed to prepare the repeat order.

Such improvement systems provide and enforce offers based on meetings with first user/second user combinations. Further, the system can provide an in-vehicle order and payment systems, and interfaces can improve the driving experience of the vehicle's occupants (e.g., by completing a repeat order transaction with a minimal contact with merchant employees).

BRIEF DESCRIPTION OF THE DRAWINGS

The above and other objects, advantages, and improvements of the disclosure will be apparent upon consideration of the following detailed description, taken in conjunction with the accompanying drawings, in which like reference characters refer to like parts throughout, and in which.

DETAILED DESCRIPTION

The present disclosure is directed to systems and methods for providing vehicle-associated offers from merchants and, more particularly, systems and methods for completing a transaction based on a scheduled meeting at the merchant's location. In some embodiments, methods and systems are provided for searching a first user's calendar schedule for a meeting with a second user, providing an offer based on a user's calendar schedule to hold the meeting at the merchant's location and automatically applying the offer from the merchant based on presence of the first user and second user at the merchant's location.

Figure 1:
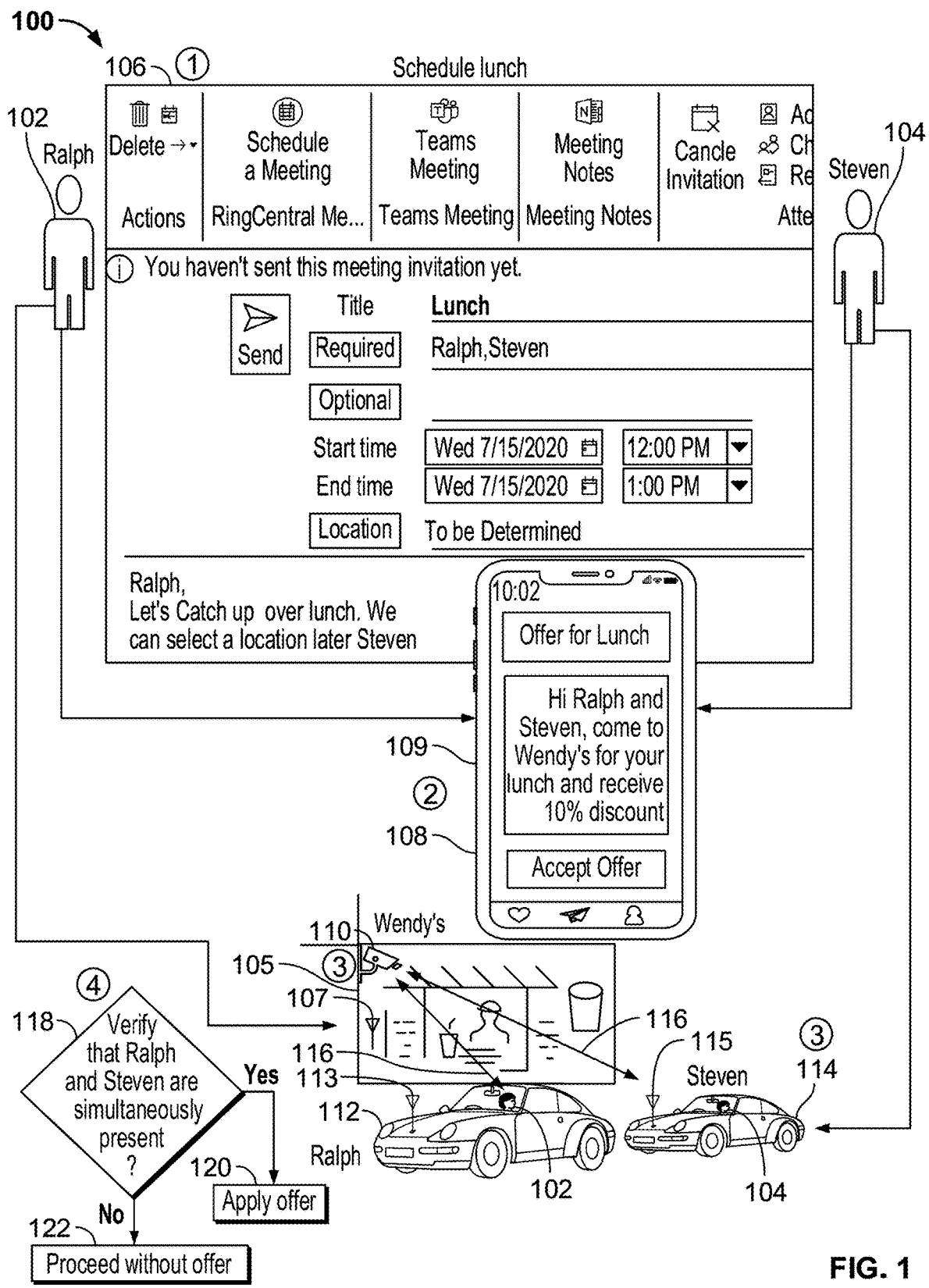
FIG. 1 shows an illustrative example of a scenario for providing an offer based on a scheduled meeting, in accordance with some embodiments of the present disclosure.

In some embodiments, methods and systems are provided for ordering a repeat order from a merchant via an internet-connected vehicle by identifying a pattern by a user at a merchant, and based on the user's location automatically placing a repeat order and without the user having to manually place the order FIG. 1 shows an illustrative example of a scenario for providing an offer based on a scheduled meeting, in accordance with some embodiments of the present disclosure. In some embodiments, as shown in FIG. 1, the system 100 includes a scheduled meeting at step 1, an offer from the merchant to the first user and second user based on the scheduled meeting at step 2, a capture of simultaneous presence of the first user and second user at the merchant's location at step 3 and verification of the first user and second user at step 4 to apply the offer to the first user's transactions. As part of the step 1, a first user 102 (e.g., Ralph) schedules a meeting with a second user 104 (Steven) using a meeting scheduling application 106 (e.g., Outlook, or any other suitable calendar applications.). Further, to schedule the meeting between the first user and the second user, the user may include date, time and a location of the meeting. Often, the date and time of the meeting are provided, and the location is left blank. Based on the scheduled meeting between the first user and the second user, the system mines the metadata associated with the meeting to identify that the scheduled meeting does not include a location.

In some embodiments, a first user 102 (e.g., Ralph) schedules a meeting with a second user 104 (Steven) using a meeting scheduling application 106 (e.g., Outlook, or any other suitable calendar application). Further, to schedule the meeting between the first user and the second user, the user may include date, time and a location of the meeting. Based on the scheduled meeting between the first user and the second user, the system mines the metadata associated with the meeting to identify the location where the meeting is being held and transmits a message to the first user and the second user with an offer of "Come to Starbucks for your meeting instead for a 20% discount." In some embodiments, the system may determine that a specific merchant is scheduled to host the meeting, and in response to identifying the merchant, the system may determine the type of merchant. In response to the identifying the merchant type, the system may transmit an offer from a competing merchant with a discount to hold the meeting at the competing merchant's location for a discount.

In some embodiments, in response to identifying that the meeting is scheduled with no determined location, at step 2, the merchant system may transmit, to an account or mobile devices 108 for each of the first user 102 and the second user 106, a message 109 for hosting the meeting. In some embodiments, the message for hosting the meeting is an offer, for example, "Hi Ralph and Steven, come to Wendy's for your lunch and receive 10% discount." The first user 102 and the second user 104 may accept the offer to update the scheduled meeting to include the location of the merchant. In some embodiments, acceptance is not needed, and the offer will be applied even if not explicitly accepted. As part of accepting the offer, the first user 102 and second user 104 may transmit to the merchant system 105 an acceptance along with metadata associated with the first user and second user. The merchant may be selected based on a history of hosting meetings between the first user 102 and the second user 104, or based on a geographical location between the first user 102 and second user 104. In some embodiments, the offer for a merchant to host the meeting may be selected based on user preference. In some embodiments, the offer for a merchant to host the meeting may be selected based on a merchant's advertisement campaign to promote the merchant. The acceptance may transmit vehicle identification information and user information associated with each of the users to the merchant for verification.

The system, at step 3, further includes a vehicle 112 with a vehicle antenna array 113 associated with the first user 102 and vehicle 114 with a vehicle antenna array 115 associated with the second user 104 at the location of the merchant 105. In some embodiments, the vehicle is autonomous or semi-autonomous, a vehicle capable of sensing its environment and moving safely with little or no human input. The vehicle may be network-connected, a vehicle that can communicate bi-directionally with other systems outside of the vehicle. Various examples of vehicle offers are described in U.S. patent application Ser. Nos. 16/810,060, 16/810,065 and 16/810,067 entitled "Systems And Methods For Generating Playlist For A Vehicle" and filed on Mar. 5, 2020, which are hereby incorporated by reference herein in their entirety.

The vehicle may communicate bi-directionally via the vehicle antenna array 113 and 115 with the merchant system 105 to facilitate and apply the offer to the transaction based on the multi-factor authentication. Each of the vehicles 112 and 114 having a vehicle antenna 113 and 115 and a vehicle interface (not shown) receives and sends signals (e.g., to accept an offer) from a merchant system 105 (e.g., Wendy's, or any other merchant). The merchant antenna 107 can receive and send information to and from merchant system 105, or cloud-based servers, to apply the offer to a transaction with the first user and second user (e.g., transaction to buy food, etc.) based on the geographical location of the vehicles 112 and 114 associated with the first user 102 and second user 104 and a merchant system 105 proximity to the vehicles 112 and 114. Each of vehicle antennas 113 and 115 is a receiver and transmitter and functions to receive or transmit signals. Vehicle antennas 113 and 115 can be, e.g., a shark fin antenna array or a flat antenna array formed on a roof of a vehicle.

In some embodiments, the vehicle antennas 113 and 115 may communicate over a wireless network such as a wireless network that operates according to a 5G specification or standard. In another embodiment, the wireless network includes a wireless network that operates according to a specification or a standard other than a 5G specification or standard. For example, the wireless network may operate as a 3G network, a 4G network, an LTE network, an LTE-Advanced (LTE-A) network, a Global System for Mobile Communications (GSM) network, a Code Division Multiple Access (CDMA) network, a Wideband Code Division Multiple Access (WCDMA) network, an Ultra Mobile Broadband (UMB) network, a High-Speed Packet Access (HSPA) network, an Evolution-Data Optimized (EV-DO) network, a Universal Mobile Telecommunications System (UMTS) network, an Apple Air-Drop, or some other type of wireless network (e.g., an ad hoc network, a non-land-based wireless network, etc.). Vehicle antenna 112 can be coupled to one or more modems to communicate over any number of the above wireless networks.

The merchant system 105 may include a database (not shown) to store all received vehicle IDs based on scheduled meetings and communicate information with the vehicle in geographical proximity to the merchant system 105 (e.g., via near-field network). This data may be stored in plain text or signature computed based on vehicle identification information and user identification information. In some embodiments, the data may be acquired upon arrival at the merchant's location. In some embodiments, the data may be entered into a merchant's database during a previous setup. For example, the first time a first user accepts an offer to host a meeting at a merchant's location, the user may be prompted, via a merchant kiosk or application, to provide vehicle and a user information, the merchant system 105 may initiate a setup sequence. During the setup, vehicle identification information and user identification information are acquired and stored in the database. In the future, this data may be used to authenticate a vehicle (first user) and vehicle (second user) pair. In some embodiments, vehicle identification information is acquired by the merchant system 105 ahead of time (e.g., a user can use a website or an app to pre-send the vehicle identification information) for each user (first user and second user) and can then be stored in the merchant's database and used to authenticate the vehicle and vehicle pair.

In some embodiments, the authentication may only require that one of the users is present at the merchant's location. For example, only one user may need to be authenticated for the offer to be applied to the transaction. Further, the systems may authenticate the single person to verify the user is present at the merchant's location. In some embodiments, the system authenticates the vehicle associated with the user. In some embodiments, the system authenticates the person by camera capture to determine that the user is present at the merchant's location.

The database can be coupled to a server or a collection of servers designed to receive and store the vehicle identification and compare the vehicle identification as transmitted upon request for a transaction to complete a multi-factor authentication (vehicle/vehicle pair). In some embodiments, upon arrival of the vehicle 112 associated with the first user 102 and vehicle 114 associated with the second user 104 near the merchant system's 105 location, to apply the offer, item 4 of FIG. 1, the merchant system 105 needs to compare the vehicle identification information for the first user 102 and vehicle identification information for the second user 104 to stored authentication information. The merchant system 105 may use a camera, or a near-field communication NFC device or an RFID device to search for the vehicle identification information for the first user 102 and vehicle identification information for the second user 104. The transmission of information (e.g., the transaction request, vehicle identification, etc.) between the vehicle identification information for the first user 102 and vehicle identification information for the second user 104 and the merchant system 105 can include over-the-air digital signals or over-the-air analog signals. One advantage of this authentication (single or multi-factor or any other suitable authentication) is the elimination of handling of coupons and the automatic application of the offer to the purchase made by the first user and second user. Further, there is no back and forth handling of coupons between the user and the merchant employee.

In some embodiments, the merchant system 105 may automatically capture the vehicle data (e.g., vehicle identification information) for each user (first user and second user), via a camera 110 with no input from the respective users, as illustrated in section 3 of the FIG. 1. For example, a camera 110 may be used to capture the information of the vehicle 112 and vehicle 114 as the vehicle 112 and vehicle 114 approach the merchant system 105. In some embodiments, the user may be prompted, via a merchant system 105 or a vehicle system, to enter a user authentication (e.g., fingerprint, password, PIN, etc.) upon arriving at the merchant location.

A first user and the second user can request to apply the offer to a transaction via the vehicle interface, or, in response to receiving a message to a mobile device associated with each of the users requesting to host the meeting in exchange for the meeting taking place at the merchant's location. To apply the offer to the transaction, the vehicle antenna 113 and the vehicle antenna 115, via a first network, may transmit the vehicle identification information for the vehicle 112 associated with first user 102 and the vehicle identification information for the vehicle 114 associated with second user 104 to the merchant antenna 107 associated with the merchant system 105 or a centrally located distribution center associated with the merchant system 105. As the vehicle 112 associated with first user 102 and the vehicle 114 associated with second user 104 approach the merchant system 105, within a threshold distance (e.g., 25, 100 feet), the merchant may capture vehicle identification information of each of the vehicles 112 and 114. In some embodiments, the system captures the vehicle identification information 114 via a second network. The system may prompt the user to complete an authentication (single or multi-factor or any other suitable authentication) by providing user authentication via user vehicle interface (not shown), or via merchant interface, request the user to face a camera to complete facial recognition, or request the user to hold a finger up to a camera or scanner for fingerprint verification. Once the first user enters or otherwise provides the user authentication, the system captures the user identification information 116 and may proceed to perform the authentication on the second user. In some embodiments, the authentication of the first user and the second user may be completed simultaneously, concurrently, independently or in any other suitable order of authentication. In some embodiments, authentication of one of the users permits the offer to be applied.

Upon the vehicle 112 associated with first user 102 and the vehicle 114 associated with second user 104 arriving at the location of the merchant system 105, the system may verify 118 that the first user and second user are present simultaneously at the merchant by comparing the captured vehicle identification information for the first user and the vehicle identification information for the second user to stored authentication information for the first user and second user. In some embodiments, the system performing the verification is an authentication application, which may be included on the merchant system 105, on a cloud-based server (e.g., rules server) or on a combination of systems. For example, the authentication application may verify the first user on a cloud-based server and the second user on the merchant system 105. In some embodiments, the verification is performed on the GPS data associated with the vehicle. For example, the system determines the GPS coordinates for each of the vehicles and then determines if the vehicle is close to the merchant. The vehicle may transmit the data identifying the vehicle using a radio frequency (RF) signal including GPS coordinates. Upon determining that the vehicle identification information for the first user and second user matches the stored authentication information (vehicle data for first user and for second user) ("Yes" at 118), at 120, the system applies the offer to the transaction of the first user. In some embodiments, applying the offer (e.g., a 10% discount automatically applied to a user's check) to the transaction includes a discount on a purchase. This leads to an improvement in scheduling meetings and while also improving coupon applications tracking systems, which can improve the user's experience at the merchant.

In a list of restaurants for hosting the meeting, as illustrated in Table 1, historical data may be obtained for transactions by a first user and second user, and the GPS location of each of the users. The GPS location may include the location of a vehicle associated with each of the users or the locations of a mobile device associated with each user or any other suitable device for identifying the GPS location of each user. The historical data may include a number of closest restaurants near the first user and second user, and merchants that have been visited by either the first user and/or second user over a predetermined period. Further, the table includes a number of coupons based on a number of factors, including recently attended, type of coupon, online rating (e.g., Yelp, Google reviews, etc.) or any other suitable metric for identifying a merchant, or a combination thereof. For example, a typical offer may be for a merchant with 4.5 stars or greater, or for a merchant that both users have previously attended, as summarized in Table 1.

In some embodiments, upon acceptance of the offer, the offer is applied to a merchant transaction based on the geographical location of the vehicle 112 associated with first user 102 and the vehicle 114 associated with second user 104 and the proximity to the merchant system 105. The system identifies a geographical location of the vehicle 112 associated with first user 102 and the vehicle 114 associated with second user 104 and a geographical location of a merchant (which may be a known value stored in a database) when requesting to apply the offer to a transaction. The system determines, based on the geographical location of the vehicle 112 associated with first user 102 and the vehicle 114 associated with second user 104 (e.g., determined by GPS, cell signal triangulations etc.) and the proximity of the vehicles to the merchant, to provide the offer for the transaction. When the geographical locations of the vehicle 112 associated with first user 102 and the vehicle 114 associated with second user 104 are within range of the merchant associated with the merchant system 105, the system applies the offer to the first user and the second user.

In some embodiments, upon the acceptance of the offer by the first user and the second user, the first user and second user may transmit data (vehicle data for each vehicle) from the vehicle to the merchant system 105, and upon arriving near the merchant system 105, the vehicle transmits second data (second data identifying the vehicle) from the vehicle 112 associated with first user 102 and the vehicle 114 associated with second user 104 to the merchant system 105. When the data transmitted during acceptance of the offer matches the data transmitted during arrival of the vehicles associated with each user, the offer is applied to the first user.

In some embodiments, the first user and the second user arrive at the merchant's location without transmitting an acceptance. Upon arriving at the merchant's location, the first user and/or second user may transmit data (vehicle data for each vehicle) from the vehicle to the merchant system 105 to apply the offer to the first user's purchase. In some embodiments, the users arrive at the location and the offer is automatically applied to their respective checks.

In some embodiments, methods and systems are described for providing an offer for a transaction to host a meeting and by automatically applying the offer based on the first user 102 and the second user 104 being present at the merchant's location. In some embodiments, the system, when scheduling a meeting, may be associated with a budget from an employer or parent. For example, when attempting to purchase a product, an authorized user (e.g., a parent or an employer) can provide a policy that includes a user, a vehicle and a rule. For example, an authorized user (e.g., a parent or an employer) can permit a child or occupant of the

TABLE 1

| User | Users GPS | Merchants Near User's GPS | Merchants recently frequented by 1st User? | Merchants identified in calendar | Rating | First offer | Second offer | Third offer |
|---|---|---|---|---|---|---|---|---|
| Ralph | 35.7327° N, 78.8503° W | Chili's | Yes | Yes | 4.6 | Chili's | Olive Garden | Pizza Hut |
| Steven | 35.9940° N, 78.8986° W | Olive Garden | Yes | Yes | 4.45 | | | |
| | | Pizza Hut | No | No | 4.65 | | | |
| | | Wawa | No | No | 4.3 | | | |
| | | Applebees | No | No | 2.9 | | | | vehicle to use a vehicle to travel to the meeting and make a purchase from a certain merchant in a certain price range.

Figure 2:
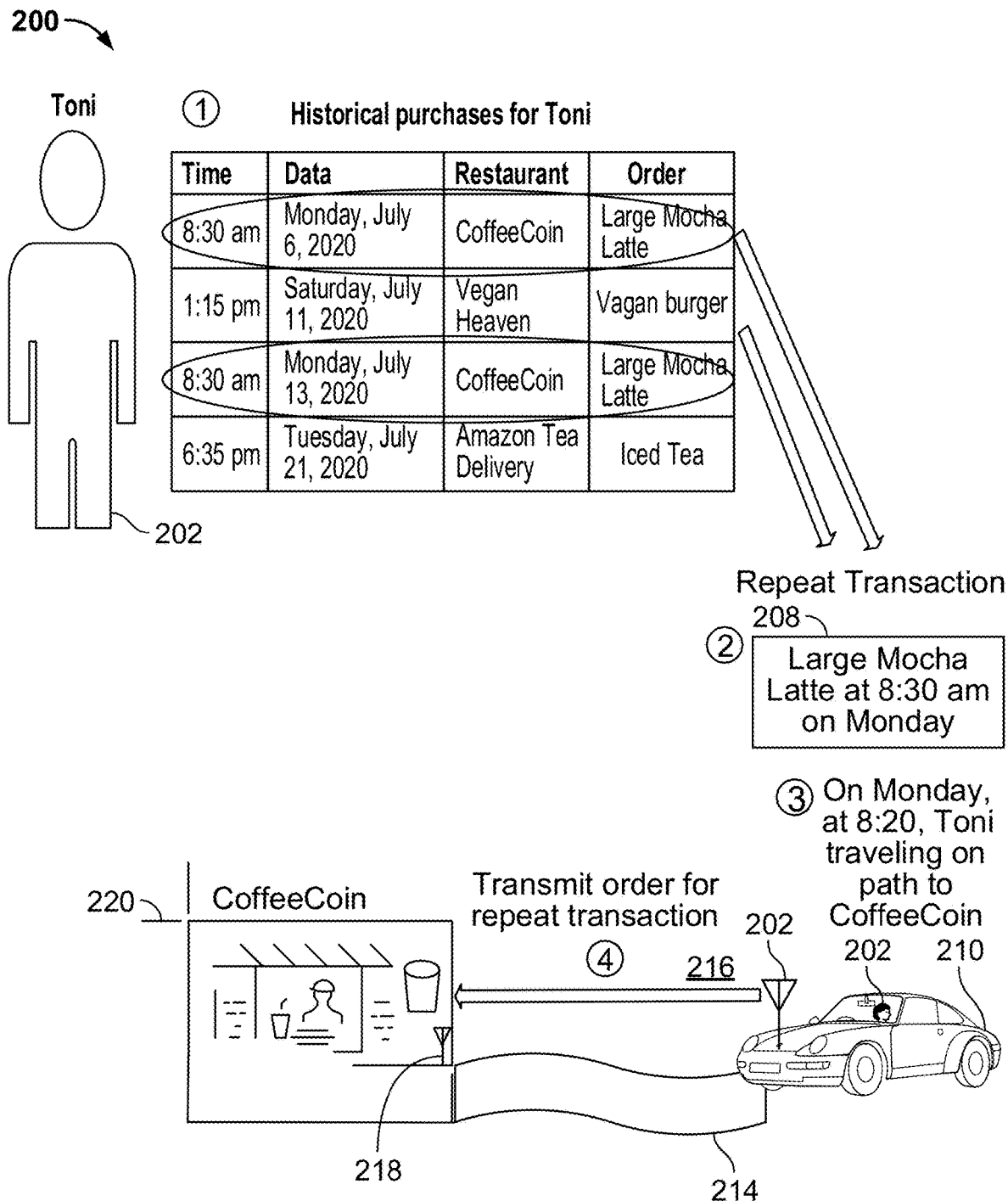
FIG. 2 shows an illustrative example of a scenario for placing a repeat order at a merchant's location based on historical purchases, in accordance with some embodiments of the present disclosure.

FIG. 2 shows an illustrative example of a scenario for placing a repeat order at a merchant's location based on historical purchases, in accordance with some embodiments of the present disclosure. In some embodiments, as shown in FIG. 2, a user 202 is associated with historical purchases 204 made by the user 202. The list of purchases includes metadata related to each of the purchases including date of purchase, time of purchase, restaurant of purchase, order, and any other suitable information about the purchase. The system identifies a pattern 206 among the list of purchases to identify a repeat transaction 208, a transaction that the user routinely makes. The pattern may be based on the type of order, order time, order date, order restaurant or any other suitable identifier or a combination thereof.

The system, at step 3, further includes a vehicle 210 with a vehicle antenna array 212 associated with the user 202 within a threshold distance of the location of the merchant system 220. In some embodiments, the vehicle is autonomous or semi-autonomous, a vehicle capable of sensing its environment and moving safely with little or no human input. The vehicle may be network-connected, a vehicle that can communicate bi-directionally with other systems outside of the vehicle. The vehicle may communicate bi-directionally via the vehicle antenna array 212 with the merchant system 220 to place the repeat order based on the location of the user's vehicle. The vehicle 210 having a vehicle antenna 212 and a vehicle interface (not shown) may transmit 216 confirmation that an order has been placed and send signals (e.g., to place an offer) from a merchant system 220 (e.g., CoffeeCoin, or any other merchant). The merchant antenna 218 can receive and send information to and from the merchant system 220, or cloud-based servers, to prepare the repeat order based on the geographical location of the vehicle 210 and a merchant system 220 proximity to the vehicle 210. The vehicle antenna 212 is a receiver and transmitter, and functions to receive or transmit signals. Vehicle antenna 212 can be, e.g., a shark fin antenna array or a flat antenna array formed on a roof of a vehicle.

In some embodiments, the system determines that the vehicle is traveling towards a location of the merchant 214 and, in response, transmits to the merchant instructions to prepare an order matching the repeat transaction. For example, the system monitors the GPS coordinates of the internet-connected vehicle as it travels on a road and in response to identifying that the vehicle is traveling to the merchant, places the order. In another example, the system monitors the GPS coordinates of the user's mobile device as it travels on a road and in response to identifying that the vehicle is traveling to the merchant, places the order. Based on identifying the GPS coordinates for the vehicle and/or user's mobile device, the system may identify the user is approaching the merchant by the GPS coordinates moving towards the merchant. For example, upon the user traveling towards the merchant, the vehicle system automatically transmits instructions to the merchant to prepare the repeat order, e.g., large mocha latte, or large dark roast coffee with a splash of milk. In some embodiments, the system may further transmit, via a vehicle user interface, a prompt to accept the repeat order. In response to receiving acceptance, the merchant may proceed to prepare the order.

In some embodiments, the system applies a time required to complete the transaction. For example, a repeat transaction occurs at a specific time during every occurrence, therefore the prompt for placing the repeat transaction may occur at the same time. That is, if the order is placed on Monday at 8:30 every time, then when the user is traveling towards the merchant at 8:15 am on a Monday, the system (e.g., vehicle system, merchant system, cloud based system) may transmit instructions for the order to the merchant.

In some embodiments, the system (e.g., vehicle system, merchant system, cloud based system) identifies the repeat transaction based on a number of repeat purchases, time of day, or day of the week. In some embodiments, the system may identify a transaction that occurred twice on a Monday at 8:30 am and flag it as a repeat transaction. Further, the user may have a plurality of repeat transactions, for example, coffee at 8:30 am at Dunkin, salad at McDonald's at 12:15, tea at 5:15 pm at Starbucks.

In some embodiments, the system may present, on a speaker in the vehicle, an offer for repeat order from the merchant. For example, as the user is driving towards the merchant, the merchant system may transmit to the vehicle an offer for the repeat order over the vehicle's speaker and microphone system. The user may transmit acceptance via the vehicle's microphone, or the vehicle's user interface. In some embodiments, the repeat order is placed automatically. In response to receiving acceptance of the repeat order via the vehicle's user interface, the merchant may proceed to prepare the repeat order.

Figure 3:
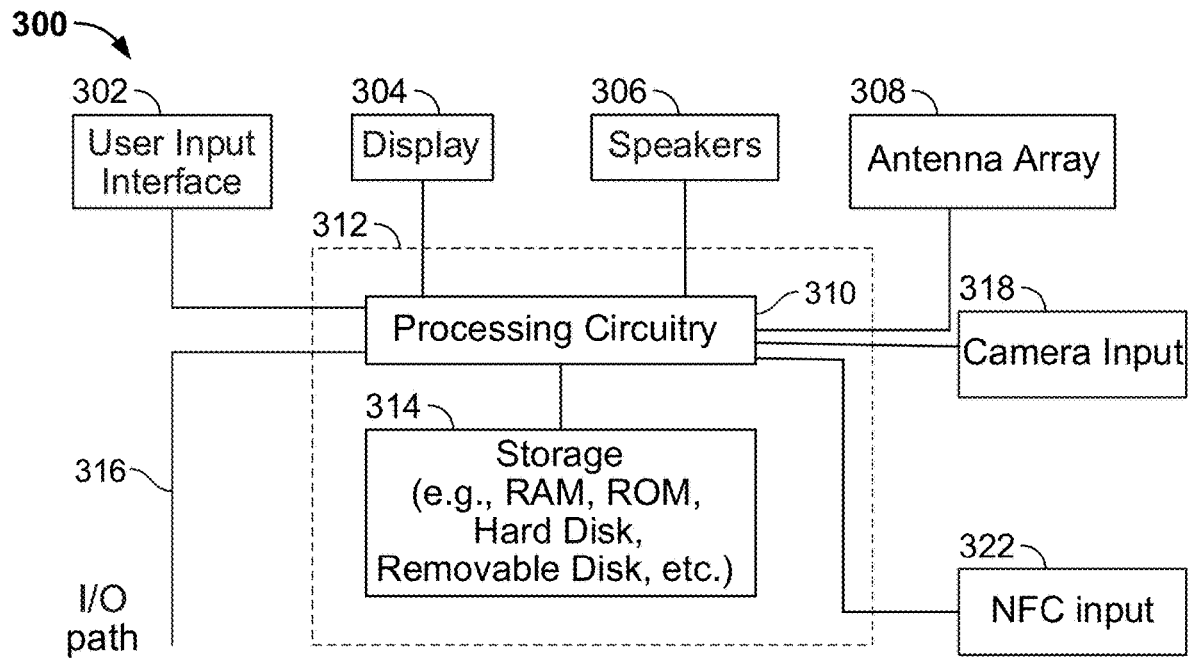
FIG. 3 depicts a block diagram of an illustrative example of a user equipment device, in accordance with some embodiments of the present disclosure.

A user or occupant in a vehicle, (e.g., first user 102 associated with vehicle 112, second user 104 associated with vehicle 114, or user 202 in a vehicle traveling towards a merchant) may access content from the vehicle content interface application (and its display screens described above and below) or from one or more of their user equipment devices. FIG. 3 shows a generalized embodiment of illustrative user equipment device 300. More specific implementations of user equipment devices are discussed below in connection with FIG. 4. User equipment device 300 may receive content and may provide data via input/output (hereinafter "I/O") path 316. I/O path 316 may provide offers and request a transaction over a local area network (LAN) or wide area network (WAN) and data to control circuitry 312, which includes processing circuitry 310 and storage 314. Control circuitry 312 may be used to send and receive commands, requests, and other suitable data using I/O path 316 or camera inputs 318, and near-field communication (NFC) inputs 322.

Control circuitry 312 may be based on any suitable processing circuitry such as processing circuitry 310. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc. It may include a multi-core processor (e.g., dual-core, quadcore, hexa-core, or any suitable number of cores) or supercomputer. In some embodiments, processing circuitry may be distributed across multiple separate processors or processing units. In some embodiments, control circuitry 312 executes instructions for a vehicle content interface application stored in memory (i.e., storage 314). Specifically, control circuitry 312 may be instructed by the vehicle content interface application to perform the functions discussed above and below. For example, the vehicle content interface application may provide instructions to control circuitry 312 to complete a transaction. In some implementations, any action performed by control circuitry 312 may be based on instructions received from the vehicle content interface application. In some embodiments, the instructions when executed by the server perform the "authentication application" as described above and below.

In client/server-based embodiments, control circuitry 312 may include communications circuitry suitable for communicating with a merchant system server or other networks or servers. The instructions for carrying out the above-mentioned functionality may be stored on the vehicle memory, or merchant system server. Communications circuitry may include a cable modem, an integrated-services digital network (ISDN) modem, a digital subscriber line (DSL) modem, a telephone modem, an Ethernet card, a wireless modem for communication with other equipment, or any other suitable communications circuitry. Such communications may be one or more networks including the internet, a mobile phone network, mobile voice or data network (e.g., a 5G, 4G or LTE network), mesh network, peer-to-peer network, cable network, or other type of communications network or combinations of communications networks. Paths may separately or together include one or more communications paths, such as a satellite path, a fiber-optic path, a cable path, a path that supports internet communications, free-space connections (e.g., for broadcast or other wireless signals), or any other suitable wired or wireless communications path or combination of such paths. In some embodiments, an antenna 308 is provided in the user equipment device 300. The antenna array 308 may be used for communication with the network of antennas. In addition, communications circuitry may include circuitry that enables peer-to-peer communication of user equipment devices or communication of user equipment devices in locations remote from each other (described in more detail below).

Memory may be an electronic storage device provided as storage 314 that is part of control circuitry 312. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Storage 314 may be used to store various types of content described herein as well as content data and content application data that are described above. Nonvolatile memory may also be used (e.g., to launch a boot-up routine and other instructions). Cloud-based storage may be used to supplement storage 314 or instead of storage 314.

Control circuitry 312 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 312 may also include scaler circuitry for upconverting and down-converting content into the preferred output format of the user equipment device 300. Control circuitry 312 may also include digital-to-analog converter circuitry and analog-to-digital converter circuitry for converting between digital and analog signals. The tuning and encoding circuitry may be used by the user equipment device to receive and to display, to play, or to record content. In some embodiments, the user equipment device 300, via the control circuitry, may include an HD antenna.

In some embodiments, speakers 306 may be provided as integrated with other elements of user equipment device 300 or may be stand-alone units. The audio and other content, may provide offers from merchants or requests to complete repeat order displayed on display 304, may be complete through speakers 306 and a user input interface 302. In some embodiments, the user part of the multi-factor authentication may be completed using a camera input 318, or NFC input, or a combination thereof. In some embodiments, the transactions may be completed using the camera input 318, to scan for the user or occupant of the vehicle, to confirm the user is in the vehicle. In some embodiments, the transactions may be completed using the near-field communication input 322, to complete multi-factor authentication for the multi vehicle verification (e.g., first user and second user).

In some embodiments, a sensor (not shown) is provided in the user equipment device 300. The sensor may be used to monitor, identify, and determine vehicular data. For example, the vehicle content interface application may receive vehicular speed data from the sensor or any other status data (e.g., global positioning data of the vehicle, driving condition of the vehicle, etc.) received from any other vehicular circuitry and/or component that describes the vehicular status of the vehicle.

The vehicle content interface application may be implemented using any suitable architecture. For example, it may be a stand-alone application wholly implemented on user equipment device 300. In such an approach, instructions for the application are stored locally (e.g., in storage 314), and data for use by the application is downloaded on a periodic basis (e.g., from an out-of-band feed, from an Internet resource, or using another suitable approach). Control circuitry 312 may retrieve instructions for the application from storage 314 and process the instructions to generate any of the displays discussed herein. Based on the processed instructions, control circuitry 312 may determine what action to perform when input is received from user input interface 302. For example, the movement of a cursor on an audio user interface element may be indicated by the processed instructions when user input interface 302 indicates that user interface 700 or 750 was selected.

In some embodiments, the vehicle content interface application is a client/server-based application. Data for use by a thick or thin client implemented on user equipment device 300 is retrieved on demand by issuing requests to a server remote from the user equipment device 300. In one example of a client/server-based content application, control circuitry 312 runs a web browser that interprets web pages provided by a remote server. For example, the remote server may store the instructions for the application in a storage device. The remote server may process the stored instructions using circuitry (e.g., control circuitry 312) and generate the displays discussed above and below. The client device may receive the displays generated by the remote server and may display the content of the displays locally on user equipment device 300. This way, the processing of the instructions is performed remotely by the server while the resulting displays are provided locally on user equipment device 300. User equipment device 300 may receive inputs from the user or occupant of the vehicle via user input interface 302 and transmit those inputs to the remote server for processing and generating the corresponding displays. For example, user equipment device 300 may transmit, via antenna array 308, communication to the remote server, indicating that a user interface element was selected via user input interface 302. The remote server may process instructions in accordance with that input and generate a display of content identifiers associated with the selected user interface element, as described in greater detail with reference to FIGS. 7A, and 7B. The generated display is then transmitted to a user equipment device 300 for presentation to the user or occupant of the vehicle.

In some embodiments, the vehicle content interface application is downloaded and interpreted or otherwise run by an interpreter or virtual machine (run by control circuitry 312). In some embodiments, the vehicle content interface application may be encoded in the ETV Binary Interchange Format (EBIF), received by control circuitry 312 as part of a suitable feed, and interpreted by a user agent running on control circuitry 312. For example, the vehicle content interface application may be an EBIF application. In some embodiments, the vehicle content interface application may be defined by a series of JAVA-based files that are received and run by a local virtual machine or other suitable middleware executed by control circuitry 312. In some embodiments (e.g., those employing MPEG-2 or other digital media encoding schemes), the vehicle content interface application may be, for example, encoded and transmitted in an MPEG2 object carousel with the MPEG audio of a program.

Figure 4:
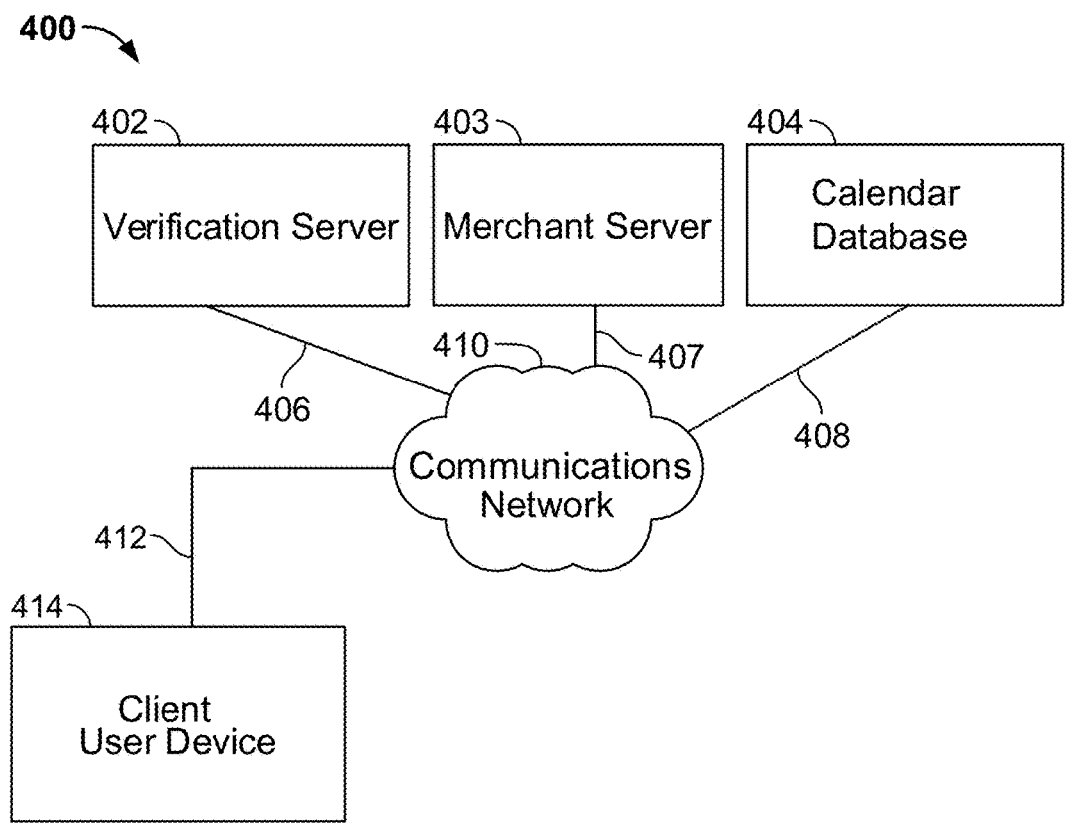
FIG. 4 depicts a block diagram of an illustrative example implementing the user equipment device, in accordance with some embodiments of the present disclosure.

FIG. 4 depicts an example of an illustrative system 400 implementing the user equipment device 300 of FIG. 3 as client user device 414, calendar database 404 or any other type of user equipment suitable for accessing content. For simplicity, these devices may be referred to herein collectively as user equipment or user equipment devices and may be substantially similar to user equipment devices described above. User equipment devices, on which a vehicle content interface application may be implemented, may function as stand-alone devices or may be part of a network of devices. Various network configurations of devices may be implemented and are discussed in more detail below.

A user equipment device utilizing at least some of the system features described above in connection with FIG. 3 may not be classified solely as client user device 414, and calendar database 404. For example, client user device 414 and calendar database 404 may be Internet-enabled, allowing for access to internet content, allowing for access to receiving multi-factor authentication to apply an offer as part of a transaction. The vehicle content interface application may have the same layout on various types of user equipment or may be tailored to the display capabilities of the user equipment. For example, on client user device 414, the vehicle content interface application may be provided as a website accessed by a web browser. In another example, the vehicle content interface application may access the calendar database 404.

The user equipment devices may be coupled to communications network 410. Communications network 410 may be one or more networks, including the Internet, a mobile phone network, mobile voice or data network (e.g., a 4G, 5G or LTE network), cable network, public switched telephone network or other type of communications network or combinations of communications networks.

System 400 includes verification server 402, and a merchant server 403 coupled to communications network 410. Communications with the verification server 402, and a merchant server 403 may be exchanged over one or more communications paths but are shown as a single path in FIG. 4 to avoid overcomplicating the drawing. Although communications between verification server 402, and a merchant server 403 with client user devices 414 and calendar database 404 are shown as through communications network 410, in some embodiments, verification server 402, and a merchant server 403 may communicate directly with client user devices 414 and 422.

Verification server 402 may include one or more types of servers distributed in the user system, merchant system 102, or a cloud-based system used to verify the multi-factor authentication to complete the offer for the transaction. Merchant server 403 may be located at a merchant's location, or cloud-based storage to store vehicle identification information. Calendar database 404 may be located in the vehicle or in cloud-based storage to store meeting information and vehicle identification information. Vehicle content interface application data may be provided to the user equipment devices using any suitable approach. In some embodiments, vehicle content interface application data from verification server 402 may be provided to user equipment using a client/server approach. For example, a user equipment device may perform the verification from a server, or a server may complete the verification of the vehicle identification information for the vehicle/vehicle pair. Verification server 402 may provide to user equipment device 414 the vehicle content interface application itself or software updates for the vehicle content interface application.

Figure 5:
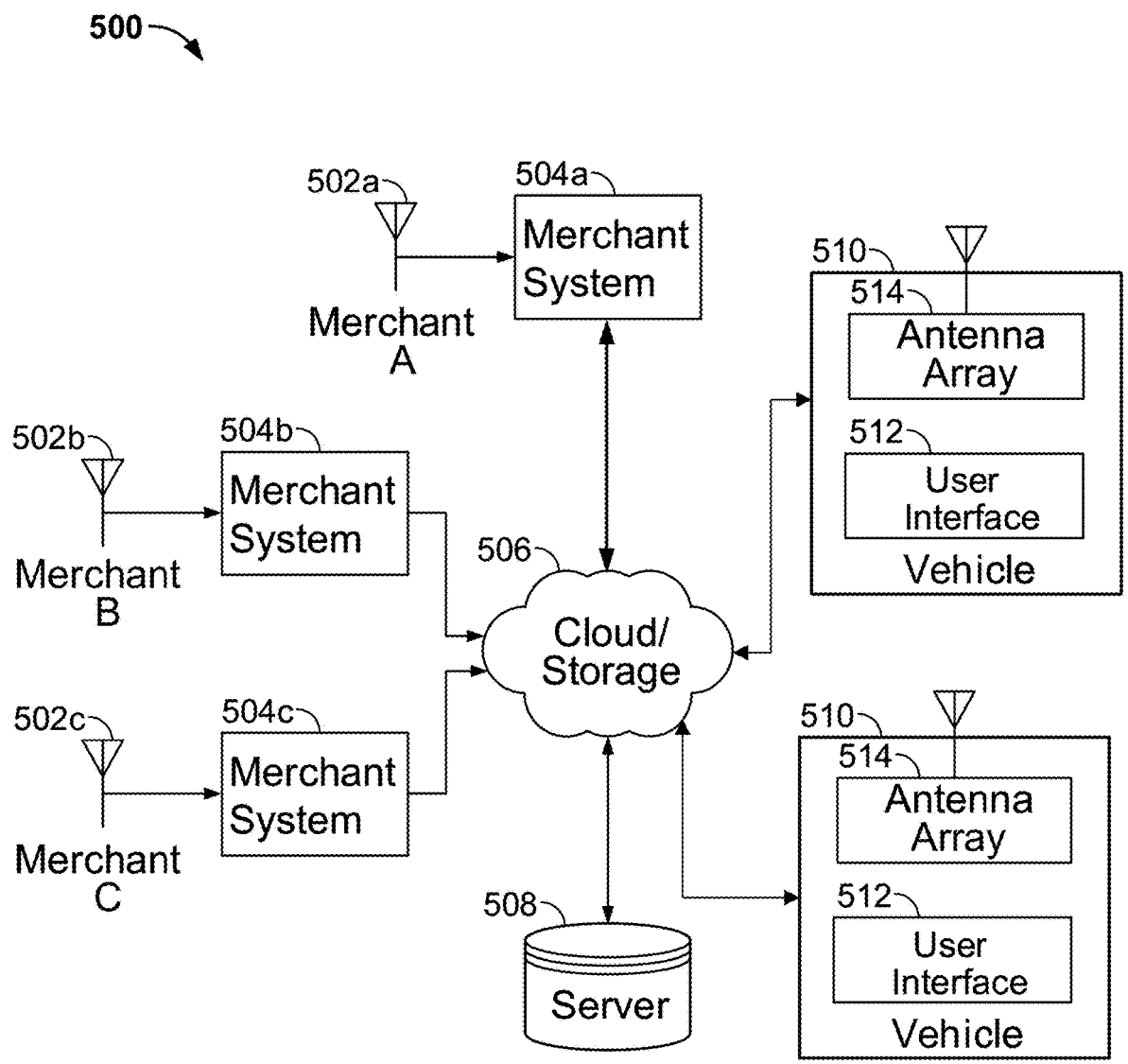
FIG. 5 depicts a block diagram of an illustrative system of a merchant system, in accordance with some embodiments of the present disclosure.

FIG. 5 depicts a block diagram of an illustrative example of a merchant system 500 in which user equipment device 300 of FIG. 3 and the system 400 of FIG. 4 can be implemented. System 500 includes an array of antennas (e.g., 502a, 502b, 502c . . . 502n) associated with a merchant and connected to merchant systems (e.g., 504a, 504b, 504c . . . 504n) coupled to storage 506, server 508 and one or more vehicles 510. Each vehicle 510 can communicate bidirectionally with other systems outside of the vehicle. Communications with an array of antennas (e.g., 502a, 502b, 502c . . . 502n) associated with merchants and connected to merchant systems (e.g., 504a, 504b, 504c . . . 504n) and storage 506 may be exchanged over one or more communications paths but are shown as a single path in FIG. 5 to avoid overcomplicating the drawing.

The array of antennas (e.g., 502a, 502b, 502c . . . 502n) associated with merchants may include a plurality of antennas dispersed at each merchant location and coupled to receive and transmit data associated with offers to host meetings, order repeat orders, multi-factor authentication to offer for a transaction. The antennas may be coupled to merchant systems (e.g., 504a, 504b, 504c . . . 504n) that collect all of the data associated with vehicle identification information and deliver it to the storage 506. In some embodiments, each of the merchant systems (e.g., 504a, 504b, 504c . . . 504n) can receive an acceptance of an offer to host a meeting between a first user and a second user, where the acceptance of the offer includes a combination of vehicle/vehicle associated with the first user and second user, respectively, to apply the offer for the transaction at that merchant. The storage 506 is connected to the server 508 for processing for recognition vehicle identification for each of the users and geographical location determination. The merchant transactions are processed through an automated content recognition. The automated content recognition can store, allocate based on content recognition and process for apply the offer for completing the transaction between the user and merchant on the user interface of the vehicle. The server 508 may be a collection of servers connected to the storage device for improved processing. Each vehicle includes a user interface 512 and a vehicle antenna 514 that communicates with the storage 506. All of the communication between the antennas, merchant systems, servers and vehicle may be through one or more networks including the internet, a mobile phone network, mobile voice or data network (e.g., a 4G, 5G or LTE network), or other type of communications network or combinations of communications networks for in-vehicle use.

Figure 6:
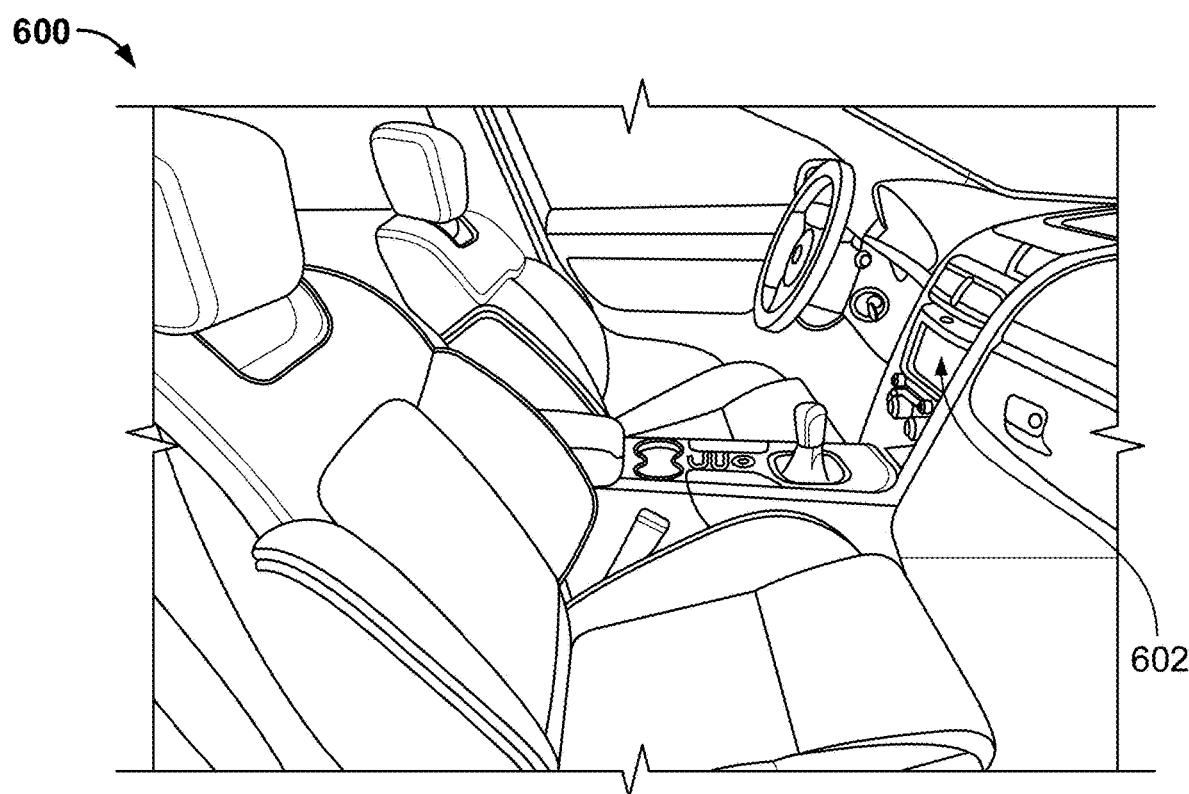
FIG. 6 depicts an illustrative example of a vehicle featuring a content display, in accordance with some embodiments of the present disclosure.

FIG. 6 depicts an illustrative example of a vehicle featuring a content display, in accordance with some embodiments of the present disclosure. In some embodiments, the user equipment device may refer to components incorporated into, coupled to, or accessible by a vehicle, such as vehicle 600 in FIG. 6. The vehicle 600 is equipped with a vehicle content interface application that may be used to enable/disable content options. For example, a user or occupant in a vehicle 600 may use vehicle content interface component 602 to access content in vehicle 600. In some embodiments, the vehicle content interface component 602 may be an audio system incorporated into vehicle 600 or user equipment used to access such content while using vehicle 600.

Figure 7A:
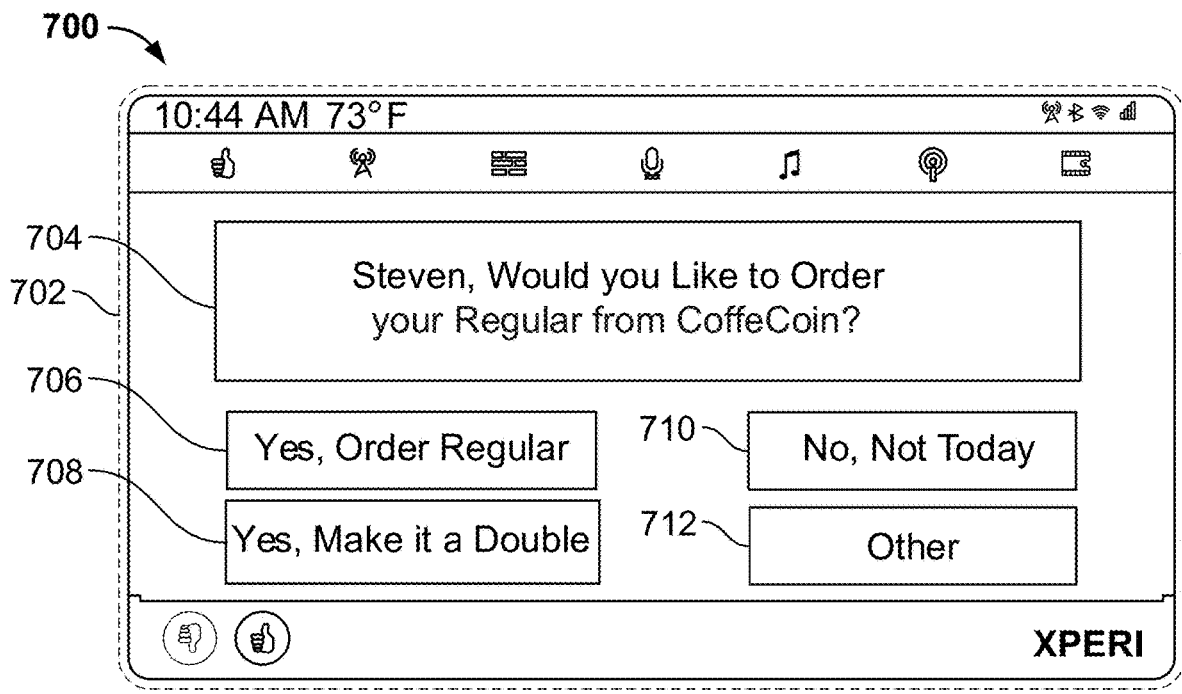
FIGS. 7A and 7B depict illustrative examples of a vehicle content interface application for displaying the confirmation of repeat orders placed in a vehicle, in accordance with some embodiments of the present disclosure.
Figure 7B:
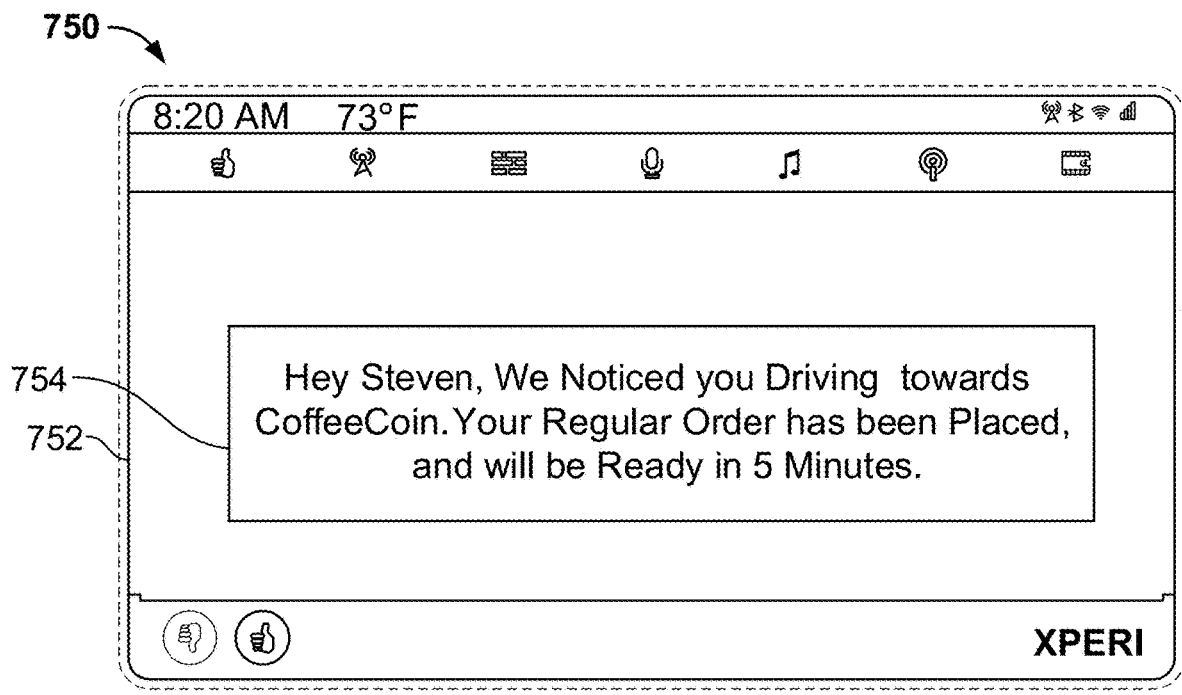

FIGS. 7A and 7B depict illustrative examples of a vehicle content interface application for displaying the confirmation of repeat orders placed in a vehicle, in accordance with some embodiments of the present disclosure. FIG. 7A shows a prompt 704 for an offer for a repeat order. The prompt 704 includes a notification to user that a repeat order may be placed, for example, "Steven, would you like to order your regular from CoffeeCoin?". In one example, when a user or occupant of a vehicle is prompted with a user interface element 702 on display 602, the vehicle content interface application may display the user interface 600 with options for selecting the repeat order or for an upgrade. For example, the user interface 700 may provide a selection of an order type, including prompt "Yes, order regular" 706, "Yes, make it a double" 708, "No, not today" 710 or "Other" options 712 to initiate the repeat order from a merchant, as shown in FIG. 7A. For example, the user may use the option for "Yes, order regular" 706 to place the repeat order and to expedite the process of preparing the order. When the user selects one of the repeat order options via the user interface (e.g., user input interface 700 incorporated into or accompanying the vehicle content interface component 702), the repeat order option corresponding to the selected option is displayed on the screen. For example, when the user selects "Yes, make it a double" 708, the vehicle content interface component 702 transmits to the merchant system 220, via the vehicle antenna 212 to the merchant antenna 218, instructions to prepare the double repeat order. In some embodiments, in response to receiving a selection of "other" 712, the system may identify options similar to the user's repeat order and present them to the user on the user interface element 702 on display 602.

In some embodiments, in response to receiving a selection of "other" 712, the system may identify orders recommended by other merchant customers and present them to the user on the user interface element 702 on display 602. In another example, when the user selects the repeat order option 710, the vehicle content interface component 702 transmits to the merchant "No, not today" 710. In some embodiments, the user may confirm the order with a voice recognition option, which is confirmed via speakers 306, and a microphone (not shown). In yet another example, when the user selects the "Other" option 712, the vehicle content interface component 702 prompts the user with options to change the repeat order, for example, to upgrade the order, or add additional items to the order. The other options may include promotions from the merchant.

In some embodiments, the user manually confirms placing the order via the vehicle content interface component 702.

FIG. 7B shows a notification 754 to the user or occupant of the vehicle that a repeat order has been placed automatically based on the vehicle traveling towards the merchant, for example, "Hey Steven, we noticed you driving towards CoffeeCoin. Your regular order has been placed and will be ready in 5 minutes." In some embodiments, to place the repeat order, the system automatically transmits the repeat order, without user input.

Figure 8:
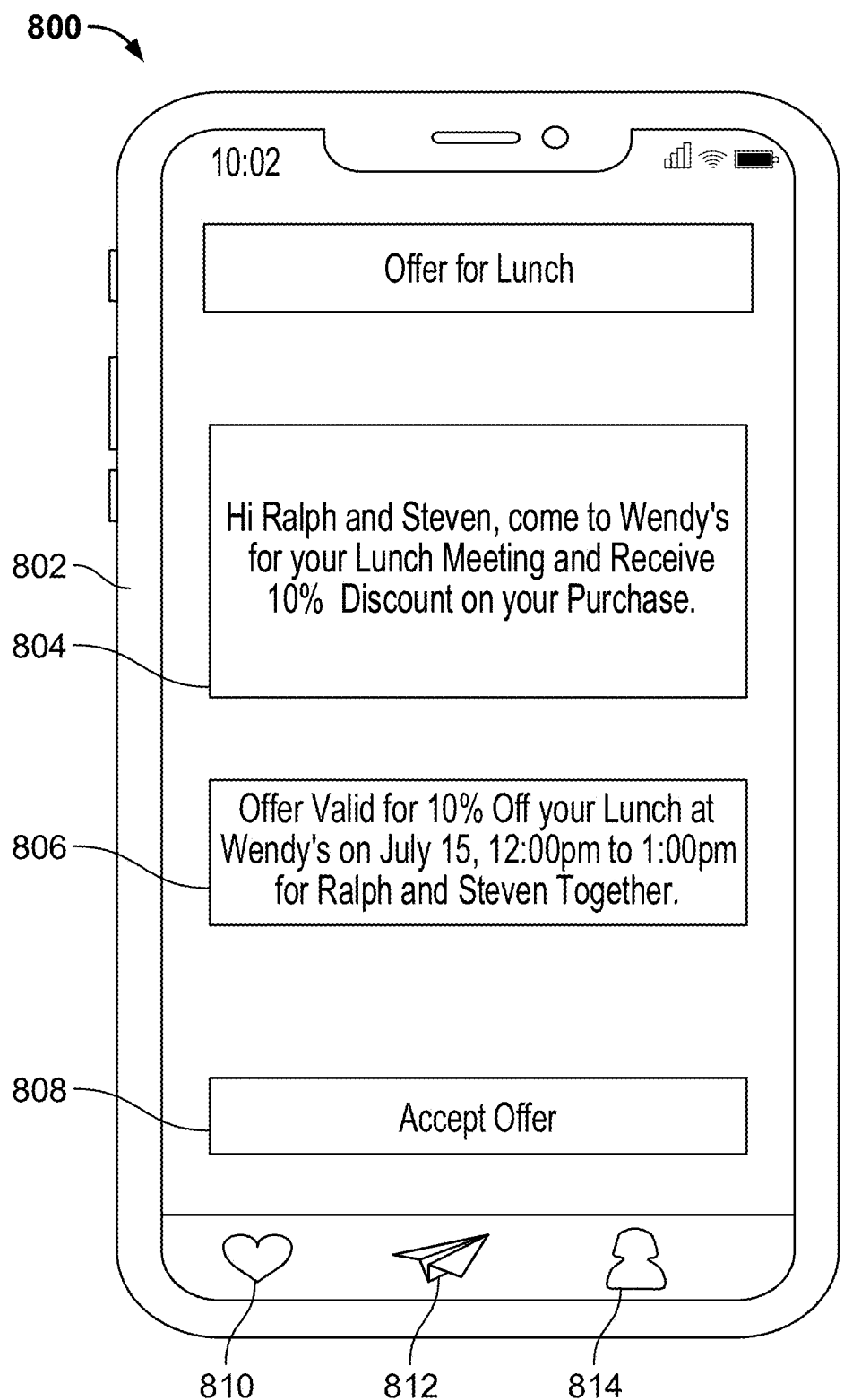
FIG. 8 shows a face view of a user device with an offer for hosting the meeting, in accordance with some embodiments of the present disclosure.

FIG. 8 shows a face view of a user device with an offer for hosting the meeting, in accordance with some embodiments of the present disclosure. The authorized user's device 800 includes illustrative device display 802 for receiving the message from the merchants. Device 800 may be a smartphone or other suitable user device configured to receive and send a policy inputted by an authorized user (e.g., parent, employer). As illustrated, device display 802 shows the message 804, the terms of the offer 806 and an option for accepting the offer 808. The message 804 includes information related to the merchant offer, for example, "Hi Ralph and Steven, come to Wendy's for your lunch meeting and receive a 10% discount on your purchase." The terms of the offer 806 include information for the offer, for example, "Offer valid for 10% off your lunch at Wendy's on July 15, 12:00 pm to 1:00 pm for Ralph and Steven together." The device further shows an option for accepting the offer 808 for hosting the meeting.

In some embodiments, in response to the first user and the second user accepting the offer from the merchant for the meeting, the merchant system may further receive an acceptance of the offer. In some embodiments, the acceptance of the offer may be transmitted upon scheduling the meeting at the merchant's location. In some embodiments, the acceptance of the offer may be transmitted upon the offer being made. In some embodiments, the acceptance of the offer may be transmitted upon the first user and second user arriving at the merchant's location. In some embodiments, acceptance of the offer is not necessary, and the offer may be applied to the transaction upon the arrival of the two vehicles at the merchant's location.

The authorized user's device 800 further includes soft buttons, for example, a like button 810, a forward button 812 and an add additional user button 814. Those may be selected by a first user (e.g., by touching the region of the screen corresponding to like button 810, forward button 812 and add additional user button 814) to add additional information to the acceptance of the offer. The like button 810 may be used to indicate that the user likes the offer and may transmit to the second user that this offer for hosting the meeting is acceptable to the first user. The forward button 812 may be used to forward the offer to the second user if he is not copied on the offer or does not have an account with the merchant. The add additional user button 814 may be used to add users to the meeting and to the offer. For example, a third user may be added to the meeting.

Figure 9:
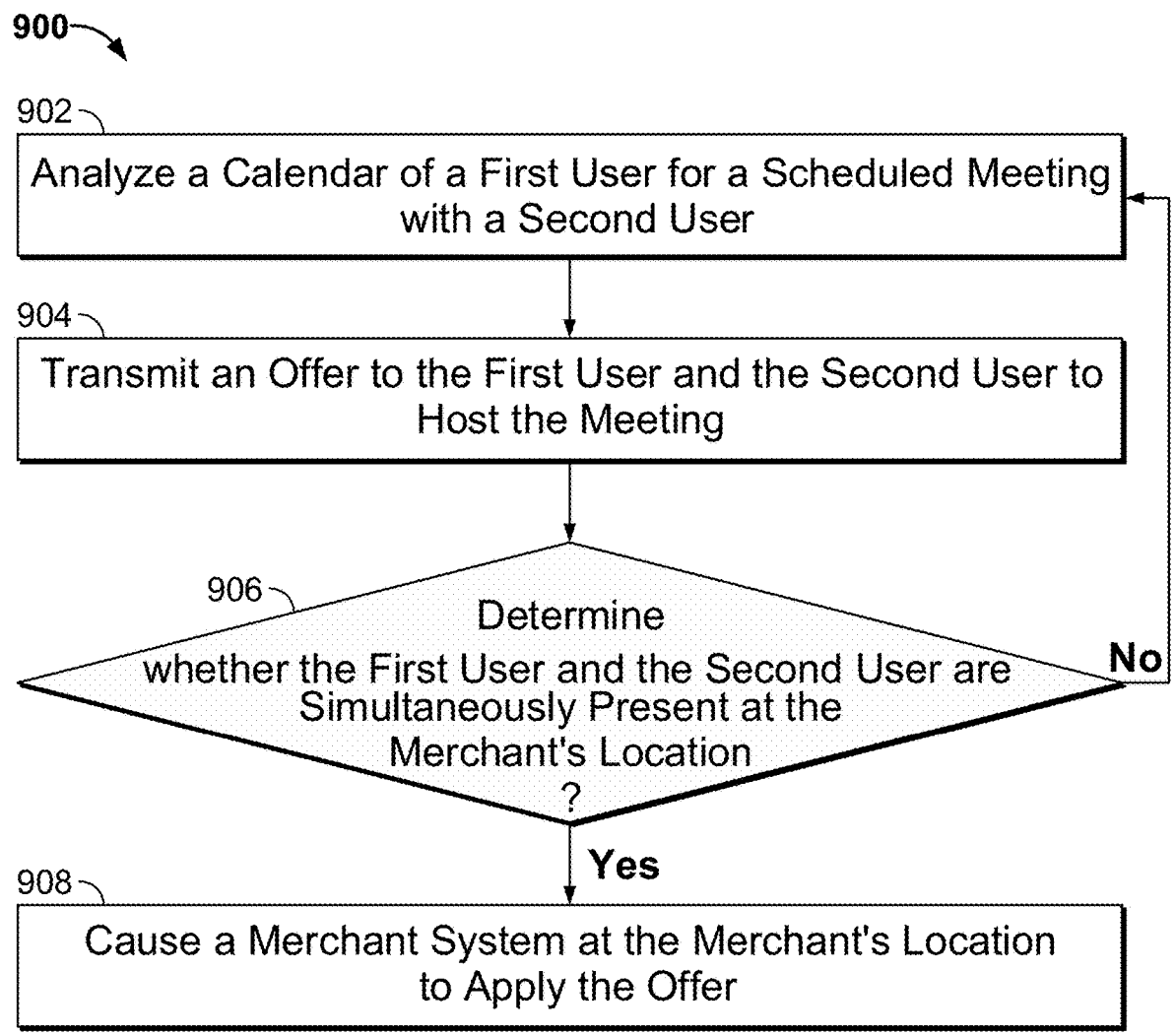
FIG. 9 is a flowchart of an illustrative process for providing an offer based on a scheduled meeting, in accordance with some embodiments of the present disclosure.

FIG. 9 is a flowchart of an illustrative process 900 for providing an offer based on a scheduled meeting, in accordance with some embodiments of the present disclosure. As shown in FIG. 9, in accordance with some embodiments, a process 900 may be executed by processing circuitry of user equipment device 300 (FIG. 3). It should be noted that process 900 or any step thereof could be performed on, or provided by, the system of FIGS. 3 and 4 or any of the devices shown in FIGS. 1, 2, and 6-8. In addition, one or more of processes 900 may be incorporated into or combined with one or more other steps described herein (e.g., incorporated into steps of process 1000). For example, process 900 may be executed by control circuitry 312 (FIG. 3) as instructed by a vehicle content interface application implemented on a user device to provide an offer to a vehicle based on vehicle identification and geographical location. In addition, one or more steps of process 900 may be incorporated into or combined with one or more steps of any other process or embodiment. At 902, the system analyzes a calendar of a first user for a scheduled meeting with a second user. The system may be at the merchant, at a vehicle, at a cloud-based server or any other suitable location for receiving requests for transactions. The system searches for meetings where the location is not specified, for example, where the location is blank, to be determined, or TBD.

At 904, the system transmits a message with an offer to the first user and/or second user to host the meeting at the merchant's location. The message may be transmitted to the first user's account, email, mobile phone or any other suitable device associated with the first user. For example, the system transmits to the first user a message that reads, "Steven, come to Wendy's for your meeting for a 10% discount on your purchase." In some embodiments, the message is transmitted to the first user and the second user. In other embodiments, the message is transmitted to only one of the users.

At 906, the system determines that the first user and the second user are simultaneously present at the merchant's location. If the system determines that the first user and the second user are simultaneously present at the merchant's location ("Yes" at 906), then, at 908, the system causes the merchant to apply the offer to the transaction of the first user automatically. In some embodiments, causing the merchant system at the location to apply the offer includes transmitting, to the merchant system, a message with instructions to apply the offer in response to detecting the first user and/or the second user at the merchant's location. This occurs without the user's input. In some embodiments, the offer may be presented as a combination to the first user and the second user. If, on the other hand, the system determines that the first user and the second user are not simultaneously present at the merchant's location ("No" at 906), then 902 may be repeated.

Figure 10:
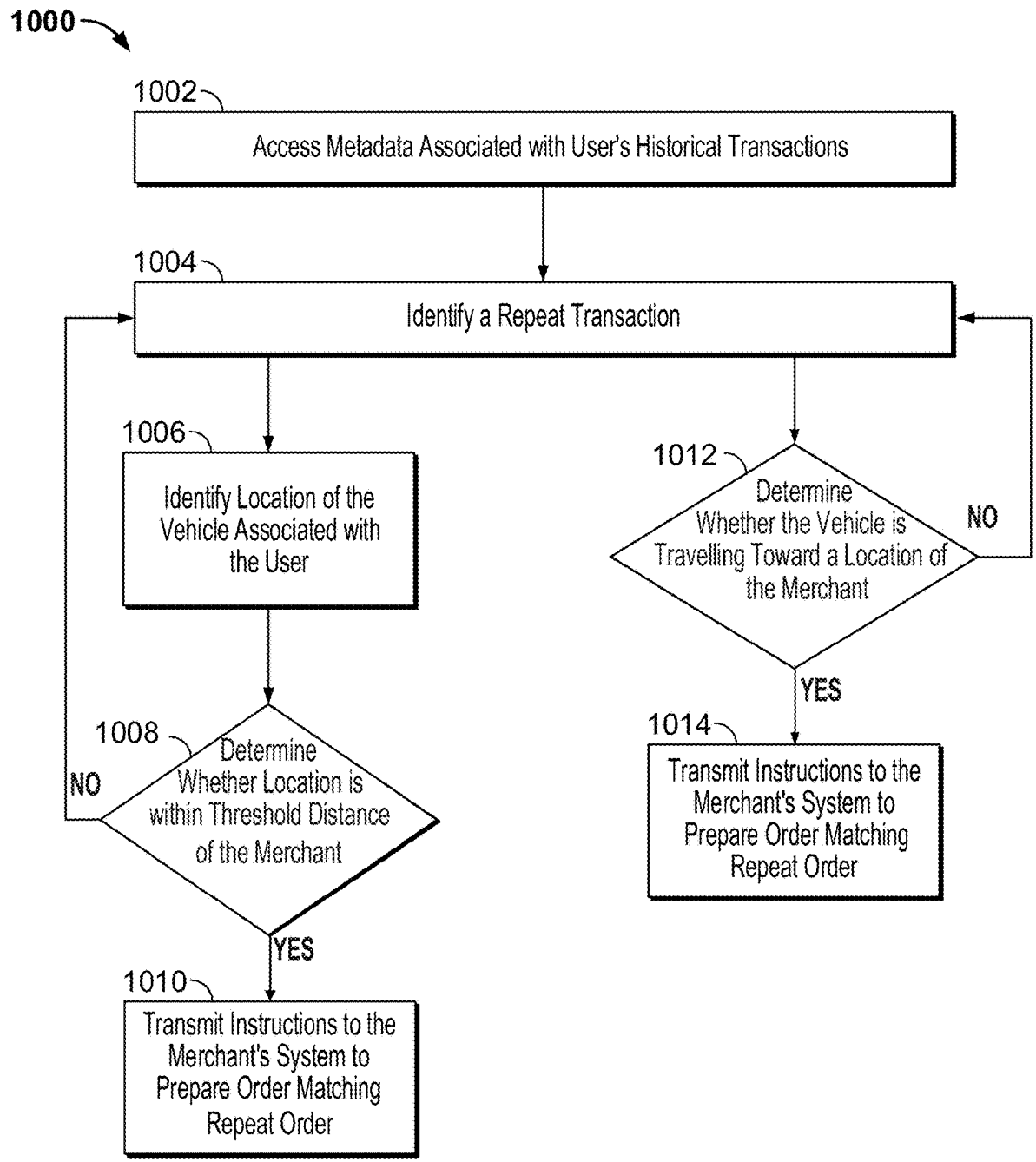
FIG. 10 is a flowchart of an illustrative process for placing a repeat order at a merchant's location based on historical purchases, in accordance with some embodiments of the present disclosure.

FIG. 10 is a flowchart of an illustrative process 1000 for placing a repeat order at a merchant's location based on historical purchases, in accordance with some embodiments of the present disclosure. As shown in FIG. 10, in accordance with some embodiments, a process 1000 may be executed by processing circuitry 300 of a vehicle (FIG. 3). It should be noted that process 1000 or any step thereof could be performed on, or provided by, the system of FIGS. 3 and 4 or any of the devices shown in FIGS. 1, 2, and 6-8. In addition, one or more of processes 1000 may be incorporated into or combined with one or more other steps described herein (e.g., incorporated into steps of process 900). For example, process 1000 may be executed by control circuitry 312 (FIG. 3) as instructed by a vehicle content interface application implemented on a user device in order to place a repeat order at a merchant's location based on historical purchases based on vehicle's geographical location. Also, one or more steps of process 1000 may be incorporated into or combined with one or more steps of any other process or embodiment.

At 1002, the system accesses the metadata associated with the user's historical transactions. For example, every transaction the user makes is stored in a database including the location, time, date, type of order, restaurant and any other suitable information.

At 1004, the system identifies a repeat transaction from the metadata associated with the historical transaction. For example, the system searches for a pattern transaction that has occurred at least two times (and, for example, occurred at the same or similar time and included the same or similar orders). In some embodiments, the pattern transaction is selected based on three repeat transactions. In some embodiments, the system evaluates the historical transaction based on time of the day, and the day of the week to identify a repeat transaction. For example, a purchase that occurs at 8:30 every morning may be triggered as a repeat order. In another example, a purchase that occurs on the same day of the week for the past number of weeks may be triggered as a repeat order. In some embodiments, the system may receive from a user input device (e.g., user device 800 (FIG. 8)) a request for placing the repeat order by providing instructions to a vehicle.

At 1006, the system identifies a location of the vehicle associated with the user. To identify the location, the system may evaluate the GPS coordinates for the vehicle, the user's mobile device or any other suitable device for tracking GPS. At 1008, based on the location of the vehicle, the system determines that the location of the vehicle is within a threshold distance of the merchant. The threshold distance may be selected based on preference and/or based on the merchant. If the system determines that the location of the vehicle is within a threshold distance of the merchant ("Yes" at 1008), then, at 1010, the system transmits instructions to the merchant to prepare the order matching the repeat order. This occurs without the user's input. If, on the other hand, the system determines that the location of the vehicle is not within a threshold distance of the merchant ("No" at 1008), then 1004 may be repeated.

At 1012, the system determines that the vehicle is traveling towards the location of the merchant. To determine that the vehicle is traveling towards the location, the system may evaluate the GPS coordinates for the vehicle, the user's mobile device or any other suitable device for tracking GPS. If the system determines that the vehicle is traveling towards a location of the merchant ("Yes" at 1012), then, at 1014, the system transmits instructions to the merchant to prepare the order matching the repeat order. This occurs without the user's ordering input explicitly requesting the order. If, on the other hand, the system determines that the vehicle is traveling towards a location of the merchant ("No" at 1008), then 1004 may be repeated.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in rea time. It should also be noted that the systems and/or methods described above may be applied to or used in accordance with other systems and/or methods.

What is claimed is:

1. A method comprising:
    identifying, based on a calendar of a first user, a scheduled meeting with a second user;
    selecting a merchant from a plurality of merchants for the scheduled meeting;
    in response to selecting the merchant for the scheduled meeting, transmitting a first message to the first user and a second message to the second user, wherein the first message and the second message each comprise an offer from the merchant based on the scheduled meeting;
    determining that the first user and the second user each accepted the offer from the merchant;
    transmitting first vehicle identification information from a first vehicle corresponding to the first user to the merchant;
    transmitting second vehicle identification information from a second vehicle corresponding to the second user to the merchant;
    determining, based on the first vehicle identification information and the second vehicle identification information, that the first vehicle of the first user who accepted the offer from the merchant and the second vehicle of the second user who accepted the offer from the merchant are within a threshold distance of the merchant;
    once the first vehicle and the second vehicle are within a threshold distance of the merchant, prompting the first user and the second user to perform authentication through facial recognition or fingerprint verification; and
    once the authentication is performed, causing a merchant system to apply the offer to a transaction by the first user.

2. The method of claim 1, wherein the determining comprises determining that the first vehicle and the second vehicle are present within the threshold distance of the merchant in a predetermined time range.

3. The method of claim 1, wherein the offer is associated with a transaction at the merchant system by the first user and the second user; and method further comprises:
    determining that the transaction completed by the first user and the second user match the offer from the merchant system.

4. The method of claim 3, wherein the transaction comprises a purchase from the merchant system, and wherein the offer comprises a discount on the purchase.

5. The method of claim 1, wherein causing the merchant system to apply the offer comprises:
    transmitting, to merchant system, a message with instructions to apply the offer in response to detecting the first user and the second user within the threshold distance of the merchant.

6. The method of claim 1, further comprising receiving an acceptance of the offer, and transmitting the acceptance to the merchant system.

7. The method of claim 6, wherein the transmitting the acceptance to the merchant system comprises one or more of:
    transmitting to the merchant system, notification to apply the offer when the offer is accepted;
    transmitting to the merchant system, notification to apply the offer when the offer is made; or
    transmitting to the merchant system, notification to apply the offer when the first user and the second user are driving to the merchant.

8. The method of claim 1, wherein determining that the first vehicle and the second vehicle are within the threshold distance of the merchant comprises:
    receiving the first vehicle identification information and the second first vehicle identification information via a merchant camera, near-field communication (NFC) device, or a radio-frequency identification (RFID) device; and
    comparing the received first vehicle identification information and the received second vehicle identification information to stored first vehicle identification information and stored second vehicle identification information.

9. The method of claim 1, wherein the merchant is selected based on a current location of the first user and the second user.

10. The method of claim 1, wherein the scheduled meeting is identified based on a conversation over a messaging application.

11. A system comprising:
    control circuitry configured to:
        identify, based on a calendar of a first user, a scheduled meeting with a second user;
        select a merchant from a plurality of merchants for the scheduled meeting;
        in response to selecting the merchant for the scheduled meeting, transmit a first message to the first user and a second message to the second user, wherein the first message and the second message each comprise an offer from the merchant based on the scheduled meeting;
        determine that the first user and the second user each accepted the offer from the merchant;
        receive first vehicle identification information from a first vehicle corresponding to the first user;
        receive second vehicle identification information from a second vehicle corresponding to the second user;
        determine, based on the first vehicle identification information and the second vehicle identification information, that the first vehicle of a first user who accepted the offer from the merchant and the second vehicle of the second user who accepted the offer from the merchant are within a threshold distance of the merchant;
        once the first vehicle and the second vehicle are within a threshold distance of the merchant, prompt the first user and the second user to perform authentication through facial recognition or fingerprint verification; and
        once the authentication is performed, cause a merchant system to apply the offer to a transaction by the first user.

12. The system of claim 11, wherein the control circuitry is configured for the offer to be associated with a transaction at the merchant system by the first user and the second user; and the control circuitry is further configured to:
    determine that the transaction completed by the first user and the second user match the offer from the merchant system.

13. The system of claim 12, wherein the control circuitry is configured for the transaction to be a purchase from the merchant system and wherein the control circuitry is configured for the offer to be a discount on the purchase.

14. The system of claim 11, wherein the control circuitry is configured to cause the merchant system to apply the offer comprises:
  transmit, to merchant system, a message with instructions to apply the offer in response to detecting the first user and the second user within the threshold distance of the merchant.

15. The system of claim 11, wherein the control circuitry is further configured to receive an acceptance of the offer, and transmit the acceptance to the merchant system.

16. The system of claim 15, wherein the control circuitry is configured to transmit the acceptance to the merchant system comprises one or more of:
  transmit to the merchant system, notification to apply the offer when the offer is accepted;
  transmit to the merchant system, notification to apply the offer when the offer is made; or
  transmit to the merchant system, notification to apply the offer when the first user and the second user are driving to the merchant.

17. The system of claim 11, wherein the control circuitry is configured to determine that the first vehicle and the second vehicle are within the threshold distance of the merchant by:
  receiving the first vehicle identification information and the second first vehicle identification information via a merchant camera, near-field communication (NFC) device, or a radio-frequency identification (RFID) device; and
  comparing the received first vehicle identification information and the received second vehicle identification information to stored first vehicle identification information and stored second vehicle identification information.

18. The system of claim 11, wherein the control circuitry is configured to select the merchant based on a current location of the first user and the second user.

19. A method comprising:
  identifying, based on a calendar of a first user, a scheduled meeting with a second user, the scheduled meeting having a predetermined time range;
  accessing data describing a plurality of merchants;
  selecting a merchant from the plurality of merchants for the scheduled meeting, the merchant associated with a merchant location;
  in response to selecting the merchant for the scheduled meeting, transmitting a first message to the first user and a second message to the second user, wherein the first message and the second message each comprise an offer from the merchant based on the scheduled meeting;
  determining that the first user and the second user each accepted the offer from the merchant;
  transmitting first vehicle identification information from a first vehicle corresponding to the first user to the merchant during the predetermined time range;
  transmitting second vehicle identification information from a second vehicle corresponding to the second user to the merchant during the predetermined time range;
  determining, based on the first vehicle identification information and the second vehicle identification information, that the first vehicle of the first user who accepted the offer from the merchant and the second vehicle of the second user who accepted the offer from the merchant are within a threshold distance of the merchant;
  once the first vehicle and the second vehicle are within a threshold distance of the merchant location during the predetermined time range, prompting the first user and the second user to perform authentication, through facial recognition or fingerprint verification; and
  once the authentication is performed, causing a merchant system at the merchant location to apply the offer to a transaction by the first user.

20. The method of claim 1, wherein determining that the first vehicle and the second vehicle are within the threshold distance of the merchant comprises:
  determining a GPS location of the first vehicle;
  determining a GPS location of the second vehicle; and
  determining that the GPS location of the first vehicle and the GPS location of the second vehicle are within the threshold distance of the merchant.

* * * * *